United States Patent

Shigemitsu et al.

(10) Patent No.: US 10,634,875 B2
(45) Date of Patent: Apr. 28, 2020

(54) IMAGING LENS

(71) Applicants: SHARP KABUSHIKI KAISHA, Sakai, Osaka (JP); KANTATSU Co., LTD, Yaita-shi (JP)

(72) Inventors: Norimichi Shigemitsu, Sakai (JP); Yoshihito Ishizue, Sakai (JP); Hisao Fukaya, Sukagawa (JP); Kaoru Yamazaki, Sukagawa (JP); Shingo Yuza, Sukagawa (JP)

(73) Assignees: SHARP KABUSHIKI KAISHA, Sakai, Osaka (JP); KANTATSU Co., LTD, Yaita-shi (JP)

( * ) Notice: Subject to any disclaimer, the term of this patent is extended or adjusted under 35 U.S.C. 154(b) by 42 days.

(21) Appl. No.: 16/094,829

(22) PCT Filed: Apr. 4, 2017

(86) PCT No.: PCT/JP2017/014094
§ 371 (c)(1),
(2) Date: Oct. 18, 2018

(87) PCT Pub. No.: WO2017/195503
PCT Pub. Date: Nov. 16, 2017

(65) Prior Publication Data
US 2019/0121060 A1 Apr. 25, 2019

(30) Foreign Application Priority Data

May 13, 2016 (JP) ................................. 2016-097350

(51) Int. Cl.
G02B 9/62 (2006.01)
G02B 13/00 (2006.01)
G02B 13/18 (2006.01)
G02B 7/04 (2006.01)
H04N 5/225 (2006.01)

(52) U.S. Cl.
CPC ................. G02B 9/62 (2013.01); G02B 7/04 (2013.01); G02B 13/00 (2013.01); G02B 13/18 (2013.01); H04N 5/2254 (2013.01)

(58) Field of Classification Search
CPC .......... G02B 9/62; G02B 13/18; G02B 13/00; G02B 7/04; G02B 13/0045
See application file for complete search history.

(56) References Cited

U.S. PATENT DOCUMENTS

2014/0098239 A1* 4/2014 Jeong ....................... G02B 9/62
348/164
2017/0023775 A1 1/2017 Shigemitsu

FOREIGN PATENT DOCUMENTS

JP H01-188814 A 7/1989
JP 2013-182090 A 9/2013
WO 2015/151697 A1 10/2015

* cited by examiner

Primary Examiner — Joseph P Martinez
(74) Attorney, Agent, or Firm — ScienBiziP, P.C.

(57) ABSTRACT

It is possible to (i) cause a sixth lens to more effectively correct various aberrations and (ii) make an optical overall length shorter. A first lens (L1) has positive refractive power. A fifth lens (L5) and a sixth lens (L6) each have negative refractive power. An object-side surface (L1F) of the first lens (L1) is a convex surface. At least one of an object-side surface and an image plane-side surface of each of a second lens (L2), a third lens (L3), a fourth lens (L4), and the fifth lens (L5) is an aspheric surface. An object-side surface (L6F) of the sixth lens (L6) is a concave surface and is an aspheric surface. An image plane-side surface (L6R) of the sixth lens (L6) is an optically planar surface throughout a region corresponding to an effective diameter of the image plane-side surface (L6R) of the sixth lens (L6).

14 Claims, 14 Drawing Sheets

| 100b: IMAGE PICKUP LENS | X: OPTICAL AXIS |
| IMG: IMAGE PICKUP PLANE | L1F~L6F: OBJECT-SIDE SURFACE |
| L1: FIRST LENS | L1R~L6R: IMAGE PLANE-SIDE SURFACE |
| L2: SECOND LENS | ST: APERTURE STOP |
| L3: THIRD LENS | IR: INFRARED CUT FILTER |
| L4: FOURTH LENS | |
| L5: FIFTH LENS | |
| L6: SIXTH LENS | |

100c: IMAGE PICKUP LENS
IMG: IMAGE PICKUP PLANE
L1: FIRST LENS
L2: SECOND LENS
L3: THIRD LENS
L4: FOURTH LENS
L5: FIFTH LENS
L6: SIXTH LENS

X: OPTICAL AXIS
L1F~L6F: OBJECT-SIDE SURFACE
L1R~L6R: IMAGE PLANE-SIDE SURFACE
ST: APERTURE STOP
IR: INFRARED CUT FILTER

| 100e: IMAGE PICKUP LENS | X: OPTICAL AXIS |
| IMG: IMAGE PICKUP PLANE | L1F~L6F: OBJECT-SIDE SURFACE |
| L1: FIRST LENS | L1R~L6R: IMAGE PLANE-SIDE SURFACE |
| L2: SECOND LENS | ST: APERTURE STOP |
| L3: THIRD LENS | IR: INFRARED CUT FILTER |
| L4: FOURTH LENS | |
| L5: FIFTH LENS | |
| L6: SIXTH LENS | |

100f: IMAGE PICKUP LENS
IMG: IMAGE PICKUP PLANE
L1: FIRST LENS
L2: SECOND LENS
L3: THIRD LENS
L4: FOURTH LENS
L5: FIFTH LENS
L6: SIXTH LENS

X: OPTICAL AXIS
L1F~L6F: OBJECT-SIDE SURFACE
L1R~L6R: IMAGE PLANE-SIDE SURFACE
ST: APERTURE STOP
IR: INFRARED CUT FILTER

100g: IMAGE PICKUP LENS
IMG: IMAGE PICKUP PLANE
L1: FIRST LENS
L2: SECOND LENS
L3: THIRD LENS
L4: FOURTH LENS
L5: FIFTH LENS
L6: SIXTH LENS

X: OPTICAL AXIS
L1F~L6F: OBJECT-SIDE SURFACE
L1R~L6R: IMAGE PLANE-SIDE SURFACE
ST: APERTURE STOP

| L6: SIXTH LENS | X: OPTICAL AXIS |

IMAGING LENS

TECHNICAL FIELD

The present invention relates to an image pickup lens.

BACKGROUND ART

An image pickup lens has been developed so far which is made up of six lenses including a first lens, a second lens, a third lens, a fourth lens, a fifth lens, and a sixth lens that are arranged in this order from an object side toward an image plane side. Further, attention has been given to arranging, in the image pickup lens, the sixth lens so that a surface of the sixth lens which surface is located on the image plane side (hereinafter, also referred to as an "image plane-side surface") is as close as possible to an image plane, mainly for the purpose of (i) causing the sixth lens to effectively correct various aberrations and (ii) making an optical overall length shorter.

An image pickup lens disclosed in Patent Literature 1 employs a sixth lens whose image plane-side surface is an optically planar surface. This makes it possible to arrange the sixth lens so that the entire image plane-side surface is close to an image plane. Note that examples of the "optically planar surface" include a structurally planar surface, a surface which is obtained by forming, on such a structurally planar surface, minute unevenness (for example, of the order of nanometers) that causes a reduction in reflectance of light, and a surface which is obtained by slightly curving such a structurally planar surface. These surfaces have a common feature that a change in light transmission or a resultant change in optical characteristic (such as refractive power or eccentricity) is so small as to be neglected in an image pickup lens.

CITATION LIST

Patent Literature

[Patent Literature 1] PCT International Publication No. WO 2015/151697 (published on Oct. 8, 2015)

SUMMARY OF INVENTION

Technical Problem

According to the image pickup lens disclosed in Patent Literature 1, there is a limitation in making a back focus shorter. Therefore, there is disadvantageously a limitation in arranging the sixth lens so that the image plane-side surface is close to the image plane.

The present invention has been made in view of the above problem, and an object of the present invention is to provide an image pickup lens which includes a sixth lens capable of more effectively correcting various aberrations and which has a shorter optical overall length.

Solution to Problem

In order to attain the above object, an image pickup lens in accordance with an aspect of the present invention is an image pickup lens which causes an image of an object to be formed on an image pickup plane of an image pickup device, the image pickup lens including: a first lens; a second lens; a third lens; a fourth lens; a fifth lens; and a sixth lens, the first lens, the second lens, the third lens, the fourth lens, the fifth lens, and the sixth lens being arranged in this order from an object side toward an image plane side, the first lens having positive refractive power, the fifth lens and the sixth lens each having negative refractive power, an object-side surface of the first lens being a convex surface, at least one of an object-side surface and an image plane-side surface of each of the second lens, the third lens, the fourth lens, and the fifth lens being an aspheric surface, an object-side surface of the sixth lens being a concave surface and being an aspheric surface, an image plane-side surface of the sixth lens being an optically planar surface throughout a region corresponding to an effective diameter of the image plane-side surface of the sixth lens, the image pickup lens satisfying the following conditional expressions:

$$0.2 < T5/ih < 0.5$$

where: T5 represents a distance, along an optical axis of the image pickup lens, between the image plane-side surface of the fifth lens and the object-side surface of the sixth lens; and ih represents a maximum image height; and $$0.5 < f1/f4 < 2.0$$

where: f1 represents a focal length of the first lens; and f4 represents a focal length of the fourth lens.

Note that, as used herein with regard to the present invention, the terms "convex" and "concave," each indicating a shape of a surface of a lens, are each defined as indicating a shape of a paraxial region (a region in a vicinity of an optical axis of an image pickup lens).

Advantageous Effects of Invention

According to an aspect of the present invention, it is possible to (i) cause a sixth lens to more effectively correct various aberrations and (ii) make an optical overall length shorter.

BRIEF DESCRIPTION OF DRAWINGS

FIG. 1 illustrates a configuration of an image pickup lens of Example 1.

FIG. 3 illustrates a configuration of an image pickup lens of Example 2.

FIG. 5 illustrates a configuration of an image pickup lens of Example 3.

FIG. 7 illustrates a configuration of an image pickup lens of Example 4.

FIG. 9 illustrates a configuration of an image pickup lens of Example 5.

FIG. 11 illustrates a configuration of an image pickup lens of Example 6.

FIG. 13 illustrates a configuration of an image pickup lens of Example 7.

DESCRIPTION OF EMBODIMENTS

The following description will discuss an embodiment of the present invention with reference to FIGS. 1 through 15.

[Outline of Configuration of Image Pickup Lens]

Figure 1:
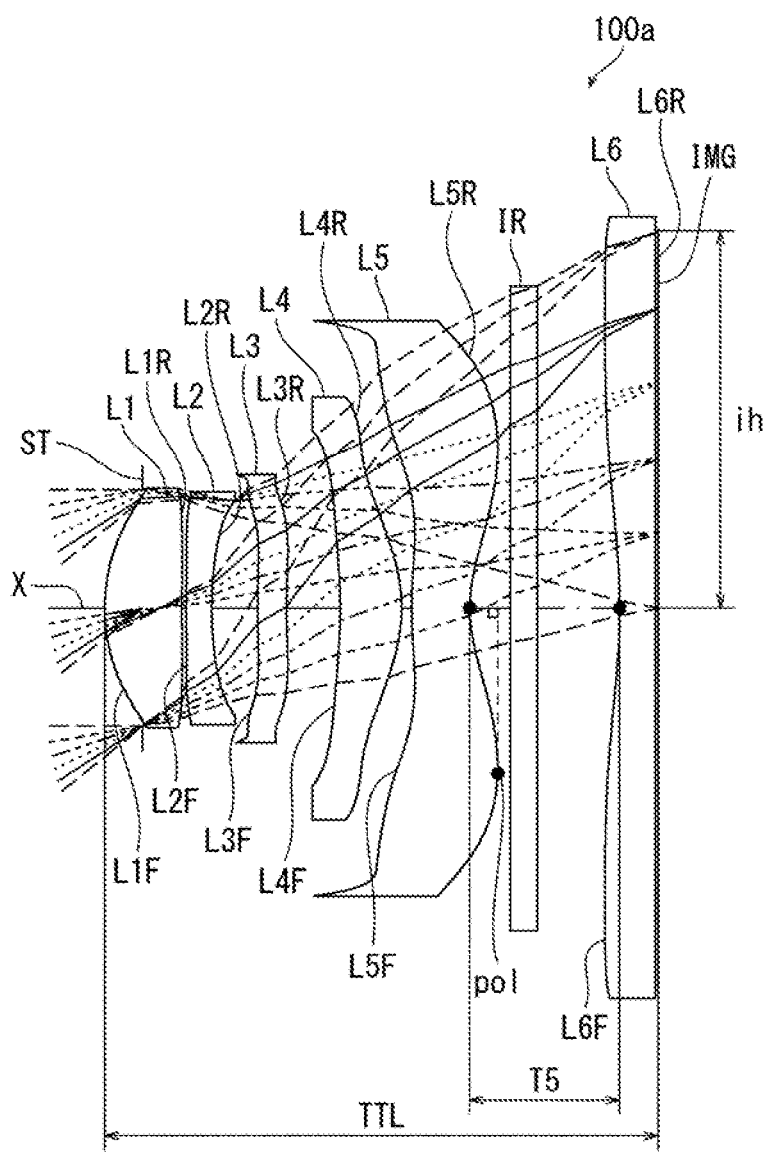
FIG. 1 is a cross-sectional view schematically illustrating a configuration of an image pickup lens in accordance with an embodiment of the present invention.

FIG. 1 is a cross-sectional view schematically illustrating a configuration of an image pickup lens 100a. An outline of the configuration of the image pickup lens 100a will be described below.

The image pickup lens 100a causes an image of an object to be formed on an image pickup plane IMG of an image pickup device (not illustrated) which image pickup plane IMG is arranged on an image plane of the image pickup lens 100a. That is, the image plane of the image pickup lens 100a and the image pickup plane IMG are located at an identical position.

The image pickup lens 100a is made up of six lenses. Specifically, the image pickup lens 100a includes a first lens L1, a second lens L2, a third lens L3, a fourth lens L4, a fifth lens L5, and a sixth lens L6. The first lens L1, the second lens L2, the third lens L3, the fourth lens L4, the fifth lens L5, and the sixth lens L6 are arranged in this order from an object side toward an image plane (image pickup plane IMG) side. The image pickup lens 100a further includes an aperture stop ST and an infrared cut filter IR. In FIG. 1, an optical axis X indicates an optical axis of the image pickup lens 100a.

The aperture stop ST is arranged so as to surround a surface L1F of the first lens L1 which surface is located on the object side (hereinafter, also referred to as an "object-side surface"). The aperture stop ST is provided for the purpose of limiting an amount of light incident on the object-side surface L1F.

The first lens L1 has positive refractive power. The object-side surface L1F of the first lens L1 is a convex surface. An image plane-side surface L1R of the first lens L1 can be a convex surface or can be alternatively a concave surface.

The second lens L2 has negative refractive power. By causing the second lens L2 to have negative refractive power, it becomes easier to correct spherical aberration and chromatic aberration each caused by the first lens L1. Note that the second lens L2 only needs to have negative refractive power, and, for example, the second lens L2 can have such a meniscus shape that an object-side surface L2F of the second lens L2 is a convex surface, can alternatively have such a meniscus shape that the object-side surface L2F is a concave surface, or can alternatively have such a shape that each of the object-side surface L2F and an image plane-side surface L2R of the second lens L2 is a concave surface. Note that it is not essential for the image pickup lens 100a that the second lens L2 have negative refractive power. Note also that, by causing at least one of the object-side surface L2F and the image plane-side surface L2R to be an aspheric surface, it is possible to realize more successful aberration correction.

The third lens L3 has positive refractive power or negative refractive power. An object-side surface L3F of the third lens L3 is a convex surface. The third lens L3 is configured such that at least one of the object-side surface L3F and an image plane-side surface L3R of the third lens L3 is an aspheric surface and, preferably, each of the object-side surface L3F and the image plane-side surface L3R is an aspheric surface. By causing (i) the object-side surface L3F to be a convex surface and (ii) each of the object-side surface L3F and the image plane-side surface L3R to be an aspheric surface, it becomes easier to correct field curvature, higher-order spherical aberration, and coma aberration. The third lens L3 is a lens which is designed to have the lowest refractive power among the above-described six lenses. The third lens L3 has a role of making aberration correction while suppressing an effect on refractive power of the entire image pickup lens 100a. Note that, for example, the third lens L3 can have such a meniscus shape that the object-side surface L3F is a convex surface or can alternatively have such a shape that each of the object-side surface L3F and the image plane-side surface L3R is a convex surface.

The fourth lens L4 has positive refractive power. An image plane-side surface L4R of the fourth lens L4 is a convex surface. The fourth lens L4 is configured such that at least one of an object-side surface L4F of the fourth lens L4 and the image plane-side surface L4R is an aspheric surface and, preferably, each of the object-side surface L4F and the image plane-side surface L4R is an aspheric surface. By causing (i) the image plane-side surface L4R to be a convex surface and (ii) each of the object-side surface L4F and the image plane-side surface L4R to be an aspheric surface, it is possible to guide light rays, which are caused to exit from the fourth lens L4, to the fifth lens L5 at a small angle of refraction throughout a region ranging from a vicinity of the optical axis X to a periphery. As a result, in the image pickup lens 100a, it becomes easier to correct various aberrations. Furthermore, by causing the object-side surface L4F to be an aspheric surface, it becomes easier to correct astigmatism and field curvature. Moreover, by (i) designing the fourth lens L4 to have positive refractive power and (ii) arranging the first lens L1 and the fourth lens L4 in a balanced manner, it becomes possible to make an optical overall length of the image pickup lens 100a shorter. Note, however, that it is not essential for the image pickup lens 100a that the fourth lens L4 have positive refractive power.

The fifth lens L5 has negative refractive power. An image plane-side surface L5R of the fifth lens L5 is a concave surface. The fifth lens L5 is configured such that at least one of an object-side surface L5F of the fifth lens L5 and the image plane-side surface L5R is an aspheric surface and, preferably, each of the object-side surface L5F and the image plane-side surface L5R is an aspheric surface. Furthermore, the image plane-side surface L5R preferably includes an aspheric surface having, at a position apart from the optical axis X, such a pole "pol" that a tangent plane at the pole "pol" is perpendicular to the optical axis X. By causing the image plane-side surface L5R to be a concave surface and to be an aspheric surface having such a pole "pol," it is possible to easily (i) correct field curvature and distortion and (ii) cause the sixth lens L6 to control a CRA (Chief Ray Angle: an angle at which a chief ray is incident on the image pickup plane IMG), while maintaining a telephotographic characteristic.

The sixth lens L6 has negative refractive power. An object-side surface L6F of the sixth lens L6 is a concave surface, and is an aspheric surface. An image plane-side surface L6R of the sixth lens L6 is an optically planar surface throughout a region corresponding to an effective diameter of the image plane-side surface L6R (according to the image pickup lens 100a, the entire image plane-side surface L6R is an optically planar surface). Note that examples of the "optically planar surface" include a structurally planar surface, a surface which is obtained by forming, on such a structurally planar surface, minute unevenness (for example, of the order of nanometers) that causes a reduction in reflectance of light, and a surface which is obtained by slightly curving such a structurally planar surface. These surfaces have a common feature that a change in light transmission or a resultant change in optical characteristic (such as refractive power or eccentricity) is so small as to be neglected in an image pickup lens. A distance between the image plane-side surface L6R and the image pickup plane IMG is preferably not more than 0.1 mm. By causing the sixth lens L6 to be close to the image pickup plane IMG, it becomes easier to correct an aberration in a periphery while suppressing an effect of an aberration on the optical axis X.

The infrared cut filter IR is arranged between the fifth lens L5 and the sixth lens L6. The infrared cut filter IR has a function of protecting the image pickup plane IMG from an infrared ray and/or a function of suppressing moire.

Since the first lens L1 has positive refractive power and the fifth lens L5 and the sixth lens L6 each have negative refractive power, the image pickup lens 100a has the telephotographic characteristic and has a shorter optical overall length.

Each of the second lens L2, the third lens L3, the fourth lens L4, and the fifth lens L5 is allocated suitable refractive power, and at least one of the object-side surface (object-side surface L2F, L3F, L4F, L5F) and the image plane-side surface (image plane-side surface L2R, L3R, L4R, L5R) is an aspheric surface. This makes it possible to correct spherical aberration, chromatic aberration, coma aberration, astigmatism, and distortion of the image pickup lens 100a.

The object-side surface L6F is designed to be such an aspheric surface that a chief ray is incident on the image pickup plane IMG at a suitable angle.

Since the image plane-side surface L6R is an optically planar surface, it is possible to arrange the sixth lens L6 so that the image plane-side surface L6R and the image pickup plane IMG are close to each other or located at an identical position. Therefore, according to the image pickup lens 100a, it is possible to cause a back focus to have an extremely small value and, accordingly, possible to make the optical overall length of the image pickup lens 100a shorter.

Here, it is assumed that the first lens L1, the second lens L2, the third lens L3, the fourth lens L4, and the fifth lens L5 constitute a first group and the sixth lens L6 constitutes a second group. In this case, the image pickup lens 100a can be configured such that the first group is movable along the optical axis X. This allows the image pickup lens 100a to be adapted to an autofocus function.

Furthermore, the image pickup lens 100a can be configured such that the first group is movable in a direction parallel to the image pickup plane IMG. This allows the image pickup lens 100a to be adapted to an image stabilization function (so-called lens shift method).

That is, by (i) unitizing the first lens L1 through the fifth lens L5 and (ii) unitizing the sixth lens L6 and the image pickup device, it is possible to form an image pickup module having an autofocus function, an image stabilization function, or both of the autofocus function and the image stabilization function. In this case, a single lens and a structure which holds the sixth lens L6 so that the sixth lens L6 is movable become unnecessary. Therefore, it is possible to reduce a weight by a weight of the single lens and a weight of the structure, as compared with a conventional configuration in which the first lens L1 through the sixth lens L6 are integrally moved. It is therefore possible to reduce electric power consumed by an actuator which realizes the autofocus function and/or the image stabilization function. In particular, in a mobile terminal, it is possible to suppress consumption of a battery.

In a case where it is intended that a height of the image pickup lens 100a, which focuses on the telephotographic characteristic, is reduced, a diameter of the sixth lens L6 is dependent on an area of the image pickup plane IMG, and is likely to be greater than a diameter of each of the first lens L1 through the fifth lens L5. According to a conventional technique, in a case where the first lens L1 through the sixth lens L6 are put in a single lens barrel, there is no other choice but to make an outer diameter of the lens barrel greater than an outer diameter of the sixth lens L6. However, according to the image pickup lens 100a, the first lens L1 through the fifth lens L5 are unitized. Therefore, according to the image pickup lens 100a, it is possible to reduce a diameter of the lens barrel, as compared with a conventional image pickup module including six lenses.

Here, the image pickup lens 100a is preferably configured so as to satisfy the following conditional expressions (1) through (10).

$$|L6Fsag|/D6 < 1.2 \tag{1}$$

$$0.2 < T5/ih < 0.5 \tag{2}$$

$$0.6 < f1/f < 1.8 \tag{3}$$

$$-3.3 < f2/f < -1.0 \tag{4}$$

$$1.0 < |f3/f| \tag{5}$$

$$0.5 < f1/f4 < 2.0 \tag{6}$$

$$(f5+f6)/f < -2.0 \tag{7}$$

$$50 < vd1 < 70 \tag{8}$$

$$20 < vd2 < 30 \tag{9}$$

$$0.5 < TTL/2ih < 1.0 \tag{10}$$

Figure 15:
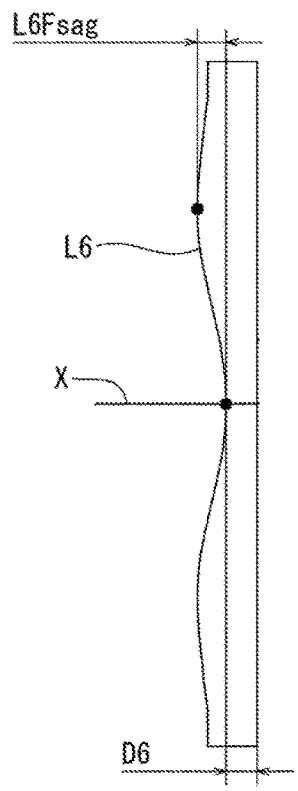
FIG. 15 is a cross-sectional view of a sixth lens, for explaining definitions of L6Fsag and D6 in a conditional expression (1).

L6Fsag represents a maximum value of an amount of sagging of the aspheric surface (hereinafter, referred to as an aspheric surface sag amount) of the object-side surface L6F (see FIG. 15). D6 represents a thickness, along the optical axis X, of the sixth lens L6 (see FIG. 15). T5 represents a distance, along the optical axis X, between the image plane-side surface L5R and the object-side surface L6F (see FIG. 1). ih represents a maximum image height of the image pickup lens 100a (see FIG. 1). f represents a focal length of the image pickup lens 100a (entire image pickup lens system). f1 represents a focal length of the first lens L1. f2 represents a focal length of the second lens L2. f3 represents a focal length of the third lens L3. f4 represents a focal length of the fourth lens L4. f5 represents a focal length of the fifth lens L5. f6 represents a focal length of the sixth lens L6. vd1 represents an Abbe number of the first lens L1 with respect to d rays (wavelength of 587.6 nm). vd2 represents an Abbe number of the second lens L2 with respect to d rays. TTL represents a distance, along the optical axis X, between the object-side surface L1F and the image pickup plane IMG (see FIG. 1: in other words, an optical overall length).

The conditional expression (1) defines a shape of the sixth lens L6. By satisfying a range represented by the conditional expression (1), it is possible to suppress an increase in thickness deviation ratio of the sixth lens L6, and possible to cause flowability of the sixth lens L6 during molding to be good.

The conditional expression (2) is a condition for appropriately defining a distance between the fifth lens L5 and the sixth lens L6 so that a CRA is appropriately controlled and various aberrations are successfully corrected. In a case where a member, such as the infrared cut filter IR, is arranged between the fifth lens L5 and the sixth lens L6, the conditional expression (2) is also a condition for securing a space in which the member is arranged. By satisfying a range represented by the conditional expression (2), it is possible to successfully control a CRA and successfully correct various aberrations, while reducing the height of the image pickup lens 100a. It should be noted that, in a case where the infrared cut filter IR is arranged between the fifth lens L5 and the sixth lens L6, a numerical range represented by the conditional expression (2) is a numerical range based on a thickness, in air, of the infrared cut filter IR.

The conditional expression (3) defines the focal length of the first lens L1 with respect to the focal length of the image pickup lens 100a. The conditional expression (4) defines the focal length of the second lens L2 with respect to the focal length of the image pickup lens 100a. The conditional expressions (3) and (4) are each a condition effective in reducing the height of the image pickup lens 100a and in correcting spherical aberration and chromatic aberration of the image pickup lens 100a.

In a case where f1/f exceeds an upper limit shown in the conditional expression (3), refractive power of the first lens L1 becomes relatively weak. This is disadvantageous for reducing the height of the image pickup lens 100a.

In a case where f1/f falls below a lower limit shown in the conditional expression (3), the refractive power of the first lens L1 becomes excessively strong. This is not favorable because a rate of occurrence of spherical aberration and chromatic aberration of the image pickup lens 100a is increased and sensitivity of the image pickup lens 100a with respect to manufacturing tolerance is increased.

In a case where f2/f exceeds an upper limit shown in the conditional expression (4), the negative refractive power of the second lens L2 becomes weak. This results in insufficient correction of spherical aberration and chromatic aberration of the image pickup lens 100a.

In a case where f2/f falls below a lower limit shown in the conditional expression (4), the negative refractive power of the second lens L2 becomes excessively strong. This is not favorable because this results in excessive correction of spherical aberration and chromatic aberration of the image pickup lens 100a and makes coma aberration of the image pickup lens 100a worse.

The conditional expression (5) defines the focal length of the third lens L3 with respect to the focal length of the image pickup lens 100a. By satisfying a range represented by the conditional expression (5), it is possible to keep refractive power in a paraxial region of the third lens L3 weak, and possible to suppress occurrence of chromatic aberration, on the optical axis X, of the third lens L3.

The conditional expression (6) is a condition for optimizing balance between the focal length of the first lens L1 and the focal length of the fourth lens L4 so that a distance, along the optical axis X, between the fifth lens L5 and the image pickup plane IMG is optimized and occurrence of an aberration is suppressed, while the height of the image pickup lens 100a is reduced.

In a case where f1/f4 exceeds an upper limit shown in the conditional expression (6), the refractive power of the first lens L1 becomes relatively weak, and refractive power of the fourth lens L4 becomes relatively strong. This causes a position of a principal point of the image pickup lens 100a to move toward the image plane side and, ultimately, causes the optical overall length of the image pickup lens 100a to be longer. Furthermore, in this case, it is likely that higher-order spherical aberration occurs in the fourth lens L4.

In a case where f1/f4 falls below a lower limit shown in the conditional expression (6), the refractive power of the first lens L1 becomes relatively strong, and the refractive power of the fourth lens L4 becomes relatively weak. Consequently, it is likely that higher-order spherical aberration occurs in the first lens L1. Furthermore, this causes the image plane-side surface L5R to be closer to the image pickup plane IMG. Therefore, it is likely that a space in which the infrared cut filter IR or the sixth lens L6 is arranged is limited.

By satisfying a range represented by the conditional expression (6), it is possible to (i) reduce sensitivity of each lens with respect to the manufacturing tolerance, (ii) suppress occurrence of higher-order spherical aberration, and (iii) cause, for example, the fifth lens L5 to successfully carry out a function of correcting field curvature and/or the sixth lens L6 to successfully carry out a function of controlling a CRA.

The conditional expression (7) defines an appropriate range of a sum of the focal length of the fifth lens L5 and the focal length of the sixth lens L6 with respect to the focal length of the image pickup lens 100a, and is a condition effective in reducing the height of the image pickup lens 100a. By satisfying a range represented by the conditional expression (7), it is possible to cause the negative refractive power of each of the fifth lens L5 and the sixth lens L6, which negative refractive power accounts for the refractive power of the image pickup lens 100a, to be appropriate. This ultimately makes it possible to reduce the height of the image pickup lens 100a while maintaining the telephotographic characteristic.

The conditional expression (8) defines an appropriate range of the Abbe number of the first lens L1. Similarly, the conditional expression (9) defines an appropriate range of the Abbe number of the second lens L2. By using a low dispersion material for the first lens L1 and using a high dispersion material for the second lens L2, it is possible to successfully correct chromatic aberration.

The conditional expression (10) defines an appropriate range of a ratio between the optical overall length of the image pickup lens 100a and the maximum image height of the image pickup lens 100a. By satisfying a range represented by the conditional expression (10), it is possible to keep the optical overall length of the image pickup lens 100a short, and possible to reduce the height of the image pickup lens 100a. Furthermore, it is possible to (i) successfully correct various aberrations, (ii) successfully control a CRA, and (iii) maintain a stable manufacturing yield, without inhibiting a degree of freedom of a thickness or a shape of each lens.

With regard to the conditional expressions (1) through (10), the image pickup lens 100a more preferably satisfies the following conditional expressions (11) through (20).

|L6Fsag|/D6<1.1     (11)

0.25<T5/ih<0.45     (12)

0.7<f1/f<1.7     (13)

−3.0<f2/f<−1.2     (14)

1.2<|f3/f|     (15)

0.6<f1/f4<1.7     (16)

(f5+f6)/f<−2.4     (17)

50<vd1<60     (18)

20<vd2<28     (19)

0.55<TTL/2ih<0.8     (20)

With regard to the conditional expressions (1) through (10), the image pickup lens 100a still more preferably satisfies the following conditional expressions (21) through (30).

|L6Fsag|/D6≤0.93     (21)

0.31≤T5/ih≤0.41     (22)

0.84≤f1/f≤1.38     (23)

−2.53≤f2/f≤−1.52     (24)

1.37≤|f3/f|     (25)

0.71≤f1/f4≤1.45     (26)

(f5+f6)/f≤−2.94     (27)

52<vd1<58     (28)

21<vd2<27     (29)

0.62≤TTL/2ih≤0.75     (30)

EXAMPLES

As examples, image pickup lenses 100a through 100g were prepared as shown in Examples 1 through 7 below. Each of the image pickup lenses 100a through 100g will be described below.

Example 1

An outline of a configuration of the image pickup lens 100a in accordance with Example 1 is as has been described in the section [Outline of configuration of image pickup lens].

Figure 2:
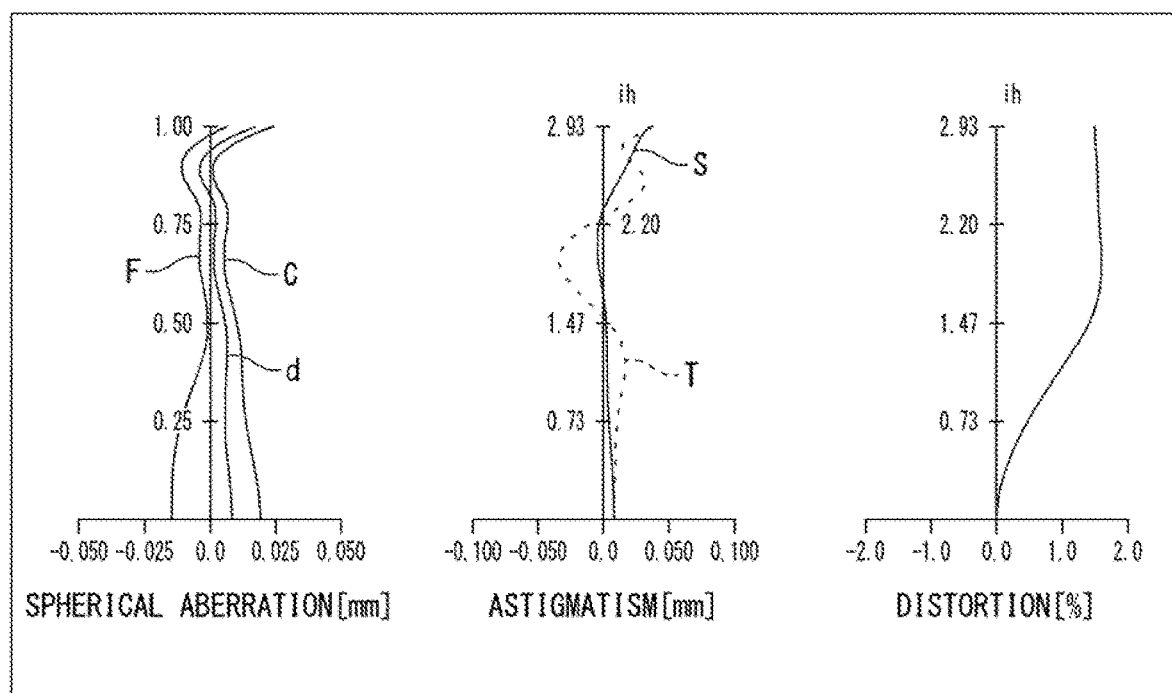
FIG. 2 is an aberration diagram illustrating various aberrations (spherical aberration, astigmatism, and distortion) of the image pickup lens illustrated in FIG. 1.

FIG. 2 is an aberration diagram illustrating various aberrations (spherical aberration, astigmatism, and distortion) of the image pickup lens 100a.

Note that, in a spherical aberration diagram illustrated in FIG. 2, "F" means a characteristic with respect to F rays (wavelength of 486.1 nm), "d" means a characteristic with respect to d rays, and "C" means a characteristic with respect to C rays (wavelength of 656.3 nm). In an astigmatism diagram illustrated in FIG. 2, "S" means a characteristic of a sagittal image plane, and "T" means a characteristic of a tangential image plane. These signs are used also in FIGS. 4, 6, 8, 10, 12, and 14 in similar senses as in FIG. 2.

As is clear from FIG. 2, according to the image pickup lens 100a, various aberrations are successfully corrected.

Table 1 below shows a design formula of the image pickup lens 100a. Note that, in Table 1, "Fno" means an F-number (F-ratio), "a" means an angle of view, "object surface" means an object side, and "image plane" means an image plane side. Further, in Table 1, "k" means a conic constant K in an aspheric equation shown in Table 1, "Ai" ("i" is an even number of 4 or more) means an ith-order aspheric coefficient Ai in the aspheric equation. Further, in the aspheric equation, "Z" means a coordinate in a direction of the optical axis X, "x" means a coordinate in a direction normal to the optical axis X, and "R" means a radius of curvature (a reciprocal of corresponding curvature). In Table 1, a refractive index (specific refractive index) Nd and an Abbe number vd are each a characteristic with respect to d rays. In Table 1, "aEb ("a" and "b" are each any number)" means $a \times 10^b$. These signs are used also in Tables 2 through 7 (later shown) in similar senses as in Table 1.

TABLE 1

Example 1 f = 3.59 mm
Fno = 1.95
ω = 38.9°
ih = 2.93 mm
TTL = 4.23 mm

Aspheric equation $$Z = \frac{x^2/R}{1 + \sqrt{1-(1+K)\cdot x^2/R}} + \sum_{i=4} A_i \cdot x^i$$

(Even number)

Surface data

| Surface number I | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.2900 | | |
| 2* | 1.4108 | 0.5985 | 1.5438 | 55.57 |
| 3* | 5.4762 | 0.0318 | | |
| 4* | 5.0541 | 0.2000 | 1.6391 | 23.25 |

TABLE 1-continued

| | | | | |
|---|---|---|---|---|
| 5* | 2.5680 | 0.3563 | | |
| 6* | 5.0563 | 0.2266 | 1.5348 | 55.66 |
| 7* | 5.6014 | 0.4148 | | |
| 8* | −4.4171 | 0.4785 | 1.5438 | 55.57 |
| 9* | −1.2211 | 0.0795 | | |
| 10* | 3.7412 | 0.4500 | 1.5348 | 55.66 |
| 11* | 1.1210 | 0.3159 | | |
| 12 | Infinity | 0.2100 | 1.5168 | 64.20 |
| 13 | Infinity | 0.6382 | | |
| 14* | −5.2269 | 0.2800 | 1.5348 | 55.66 |
| 15 | Infinity | 0.0200 | | |
| (Image plane) | Infinity | | | |

Standard wavelength 587.6 nm

| Lens | Initial surface | Focal length (mm) | |
|---|---|---|---|
| 1 | 2 | 3.32 (=f1) | |
| 2 | 4 | −8.43 (=f2) | |
| 3 | 6 | 84.85 (=f3) | |
| 4 | 8 | 2.95 (=f4) | |
| 5 | 10 | −3.18 (=f5) | |
| 6 | 14 | −9.77 (=f6) | L6Fsag −0.125 mm |

Aspheric surface data

| | 2nd surface | 3rd surface | 4th surface | 5th surface | 6th surface | 7th surface |
|---|---|---|---|---|---|---|
| k | −8.388936E−01 | 0.000000E+00 | 0.000000E+00 | −1.378166E+00 | 0.000000E+00 | 0.000000E+00 |
| A4 | 2.065329E−02 | −6.414378E−01 | −7.279317E−01 | −2.621502E−01 | −3.625213E−01 | −2.916020E−01 |
| A6 | 8.759987E−02 | 1.968257E+00 | 2.374597E+00 | 1.473427E+00 | 7.152903E−01 | 6.556809E−01 |
| A8 | −2.077684E−01 | −3.092019E+00 | −3.173283E+00 | −4.334213E+00 | −3.518342E+00 | −3.017548E+00 |
| A10 | 2.327808E−01 | 1.906718E+00 | 1.161220E−01 | 1.013383E+01 | 1.022635E+01 | 7.369947E+00 |
| A12 | −9.527399E−02 | 7.808134E−01 | 5.083373E−01 | −1.605646E+01 | −1.750146E+01 | −1.013641E+01 |
| A14 | −4.386478E−02 | −1.784773E+00 | −5.748494E+00 | 1.499268E+01 | 1.599496E+01 | 7.333433E+00 |
| A16 | 0.000000E+00 | 7.096496E−01 | 2.050599E+00 | −5.916316E+00 | −5.738680E+00 | −2.095080E+00 |

| | 8th surface | 9th surface | 10th surface | 11th surface | 14th surface |
|---|---|---|---|---|---|
| k | 1.742376E+00 | −4.936029E+00 | 0.000000E+00 | −5.938808E+00 | 0.000000E+00 |
| A4 | 9.262020E−02 | −1.130680E−02 | −2.202832E−01 | −1.091131E−01 | 3.387237E−02 |
| A6 | −4.563559E−02 | −1.247105E−02 | 4.772379E−02 | 4.307105E−02 | −5.651470E−03 |
| A8 | 1.476727E−02 | 7.687616E−03 | −2.472789E−03 | −1.390469E−02 | 4.142999E−04 |
| A10 | −5.473686E−02 | −3.859784E−02 | 1.447647E−02 | 2.944981E−03 | 1.322329E−05 |
| A12 | 6.292972E−02 | −3.856333E−04 | −9.205365E−03 | −3.934073E−04 | −4.326454E−06 |
| A14 | −2.964772E−02 | 3.503508E−03 | 2.032824E−03 | 2.389281E−05 | 2.168685E−07 |
| A16 | 5.022724E−03 | −5.638131E−04 | −1.552021E−04 | 1.554594E−07 | 0.000000E+00 |

Example 2

Figure 3:
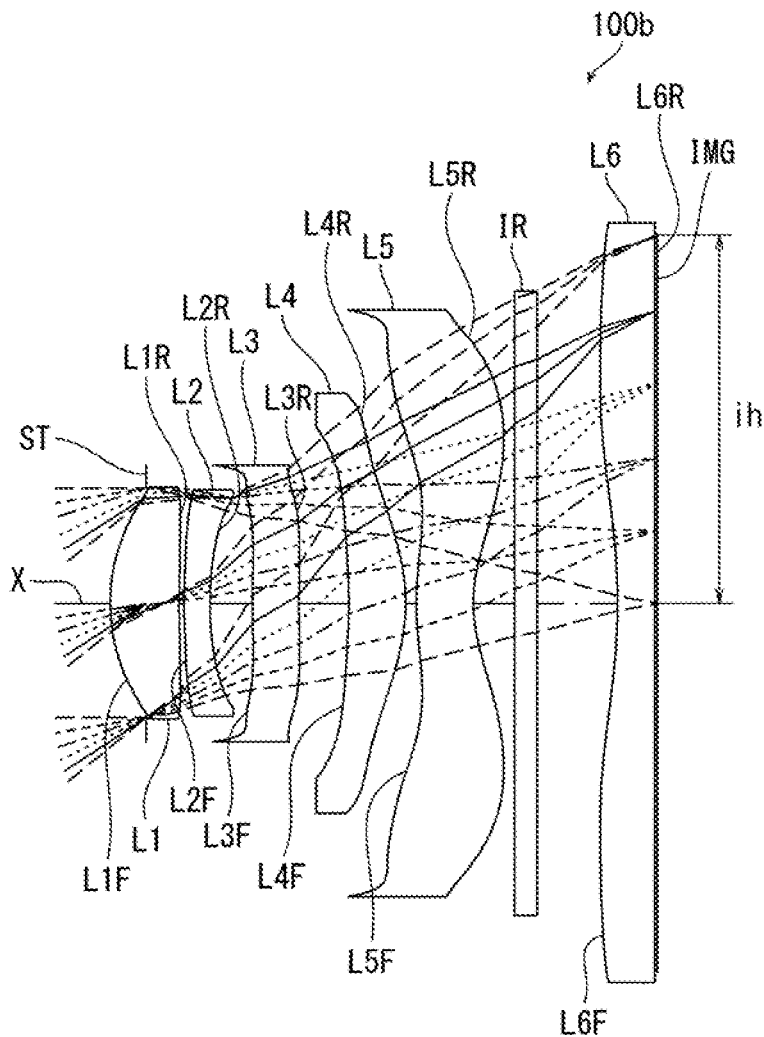
FIG. 3 is a cross-sectional view schematically illustrating a configuration of an image pickup lens in accordance with an embodiment of the present invention.

FIG. 3 is a cross-sectional view illustrating a configuration of an image pickup lens 100b in accordance with Example 2. An outline of the configuration of the image pickup lens 100b is similar to that of the configuration of the image pickup lens 100a illustrated in FIG. 1.

Figure 4:
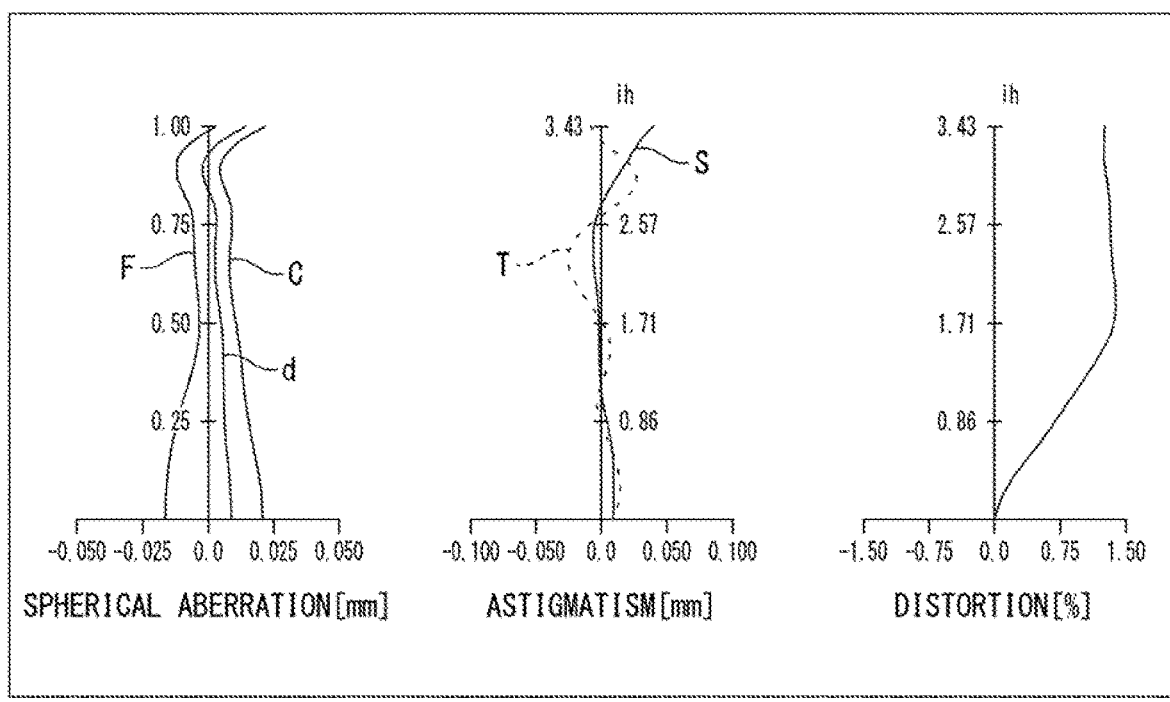
FIG. 4 is an aberration diagram illustrating various aberrations (spherical aberration, astigmatism, and distortion) of the image pickup lens illustrated in FIG. 3.

FIG. 4 is an aberration diagram illustrating various aberrations (spherical aberration, astigmatism, and distortion) of the image pickup lens 100b.

As is clear from FIG. 4, according to the image pickup lens 100b, various aberrations are successfully corrected.

Table 2 below shows a design formula of the image pickup lens 100b.

TABLE 2

Example 2
f = 4.18 mm
Fno = 1.94
ω = 39.0°
ih = 3.43 mm
TTL = 5.03 mm

Surface data

| Surface number i | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.3332 | | |
| 2* | 1.7028 | 0.6416 | 1.5443 | 55.86 |
| 3* | 6.5246 | 0.0465 | | |
| 4* | 4.2700 | 0.2400 | 1.6503 | 21.54 |
| 5* | 2.5747 | 0.4002 | | |

TABLE 2-continued

Example 2
f = 4.18 mm
Fno = 1.94
ω = 39.0°
ih = 3.43 mm
TTL = 5.03 mm

| | | | | |
|---|---|---|---|---|
| 6* | 9.7482 | 0.4336 | 1.5348 | 55.66 |
| 7* | 12.9117 | 0.4621 | | |
| 8* | −5.3030 | 0.5312 | 1.5443 | 55.86 |
| 9* | −1.6788 | 0.1000 | | |
| 10* | 2.9212 | 0.5300 | 1.5348 | 55.66 |
| 11* | 1.3120 | 0.3850 | | |
| 12 | Infinity | 0.2100 | 1.5168 | 64.20 |
| 13 | Infinity | 0.7502 | | |
| 14* | −5.6510 | 0.3500 | 1.5348 | 55.66 |
| 15 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 4.04 (=f1) | | |
| 2 | 4 | −10.56 (=f2) | | |
| 3 | 6 | 71.01 (=f3) | | |
| 4 | 8 | 4.29 (=f4) | | |
| 5 | 10 | −5.03 (=f5) | | |
| 6 | 14 | −10.57 (=f6) | L6Fsag | −0.162 mm |

Aspheric surface data

| | 2nd surface | 3rd surface | 4th surface | 5th surface | 6th surface | 7th surface |
|---|---|---|---|---|---|---|
| k | −9.455152E−01 | 0.000000E+00 | 0.000000E+00 | −2.445722E+00 | 0.000000E+00 | 0.000000E+00 |
| A4 | 1.487957E−02 | −2.985415E−01 | −3.646561E−01 | −1.461948E−01 | −1.356296E−01 | −1.007042E−01 |
| A6 | 3.284125E−02 | 7.054312E−01 | 8.657295E−01 | 5.338783E−01 | 1.092668E−01 | 1.142562E−01 |
| A8 | −6.343680E−02 | −9.836895E−01 | −1.039339E+00 | −1.120021E+00 | −4.034649E−01 | −4.063103E−01 |
| A10 | 5.954322E−02 | 8.729789E−01 | 7.036872E−01 | 1.993354E+00 | 9.187150E−01 | 6.800028E−01 |
| A12 | −2.471966E−02 | −5.277462E−01 | −2.204561E−01 | −2.345707E+00 | −1.185237E+00 | −6.153403E−01 |
| A14 | −1.335575E−03 | 1.926073E−01 | −2.042024E−03 | 1.563715E+00 | 8.074177E−01 | 2.909963E−01 |
| A16 | 0.000000E+00 | −3.241995E−02 | 1.268775E−02 | −4.338346E−01 | −2.138319E−01 | −5.418651E−02 |

| | 8th surface | 9th surface | 10th surface | 11th surface | 14th surface |
|---|---|---|---|---|---|
| k | 1.741289E+00 | −8.396204E+00 | 0.000000E+00 | −5.144501E+00 | 0.000000E+00 |
| A4 | 9.504462E−02 | −4.156058E−02 | −1.534997E−01 | −6.746817E−02 | 1.043931E−02 |
| A6 | −8.421107E−02 | 6.143047E−02 | 2.438852E−02 | 1.961000E−02 | 2.985015E−03 |
| A8 | 3.577367E−02 | −6.078007E−02 | 1.674802E−04 | −4.374128E−03 | −9.738338E−04 |
| A10 | −1.283805E−02 | 4.097848E−02 | 1.135067E−03 | 6.125390E−04 | 1.164532E−04 |
| A12 | 3.276015E−03 | −1.495481E−02 | −6.489208E−04 | −5.280327E−05 | −6.542061E−06 |
| A14 | −2.831856E−04 | 2.676560E−03 | 1.040425E−04 | 2.177530E−06 | 1.444622E−07 |
| A16 | −3.598647E−05 | −1.882258E−04 | −5.497836E−06 | 1.775450E−11 | 0.000000E+00 |

Example 31

Figure 5:
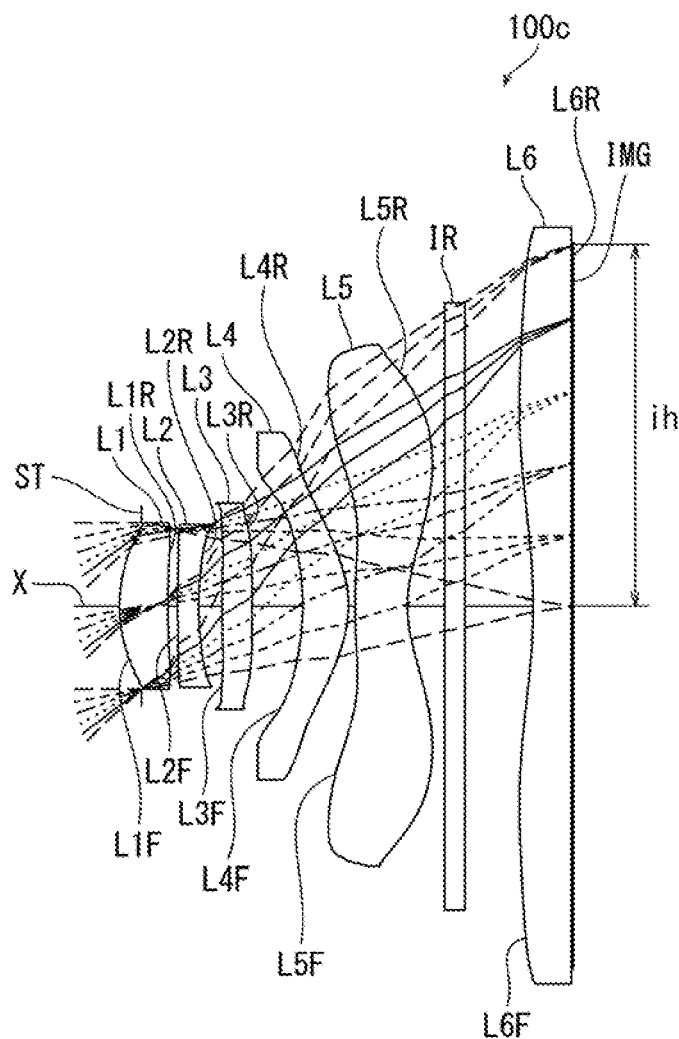
FIG. 5 is a cross-sectional view schematically illustrating a configuration of an image pickup lens in accordance with an embodiment of the present invention.

FIG. 5 is a cross-sectional view illustrating a configuration of an image pickup lens 100c in accordance with Example 3. An outline of the configuration of the image pickup lens 100c is similar to that of the configuration of the image pickup lens 100a illustrated in FIG. 1.

Figure 6:
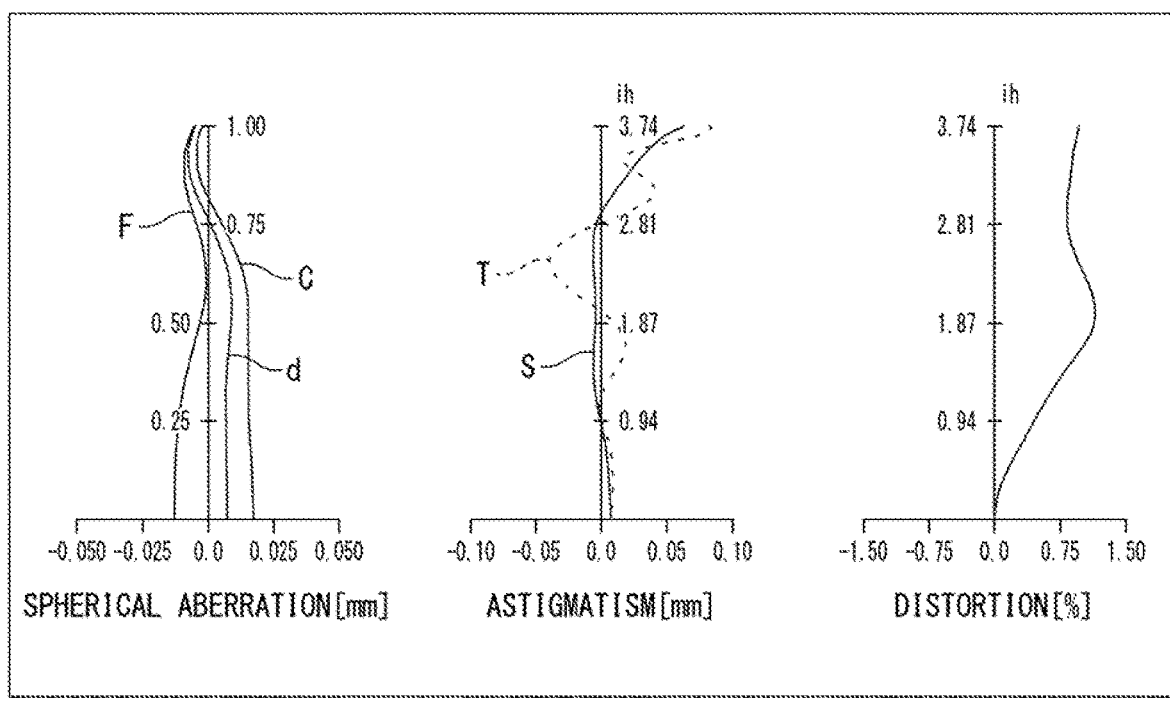
FIG. 6 is an aberration diagram illustrating various aberrations (spherical aberration, astigmatism, and distortion) of the image pickup lens illustrated in FIG. 5.

FIG. 6 is an aberration diagram illustrating various aberrations (spherical aberration, astigmatism, and distortion) of the image pickup lens 100c.

As is clear from FIG. 6, according to the image pickup lens 100c, various aberrations are successfully corrected.

Table 3 below shows a design formula of the image pickup lens 100c.

TABLE 3

Example 3
f = 3.90 mm
Fno = 2.25
ω = 43.5°
ih = 3.74 mm
TTL = 4.63 mm

Surface data

| Surface number i | Radius of curvature r (mm) | Surface distance d (mm) | Refractive index Nd | Abbe number νd |
|---|---|---|---|---|
| (Object surface) | Infinity | Infinity | | |
| 1 (Stop) | Infinity | −0.2264 | | |
| 2* | 1.5449 | 0.5000 | 1.5443 | 55.86 |
| 3* | 5.2851 | 0.1002 | | |
| 4* | 7.0228 | 0.2200 | 1.6503 | 21.54 |
| 5* | 3.0865 | 0.2411 | | |
| 6* | 6.3163 | 0.3115 | 1.5348 | 55.66 |
| 7* | 137.6029 | 0.5255 | | |
| 8* | −2.5443 | 0.4746 | 1.5443 | 55.86 |
| 9* | −1.1050 | 0.0692 | | |
| 10* | 6.8282 | 0.5400 | 1.5348 | 55.66 |
| 11* | 1.2812 | 0.3870 | | |
| 12 | Infinity | 0.2100 | 1.5168 | 64.20 |
| 13 | Infinity | 0.7062 | | |
| 14* | −5.8403 | 0.3950 | 1.5348 | 55.66 |
| 15 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 3.83 (=f1) | | |
| 2 | 4 | −8.66 (=f2) | | |
| 3 | 6 | 12.37 (=f3) | | |
| 4 | 8 | 3.22 (=f4) | | |
| 5 | 10 | −3.05 (=f5) | | |
| 6 | 14 | −10.92 (=f6) | L6Fsag | −0.142 mm |

Aspheric surface data

| | 2nd surface | 3rd surface | 4th surface | 5th surface | 6th surface | 7th surface |
|---|---|---|---|---|---|---|
| k | −9.466764E−01 | 0.000000E+00 | 0.000000E+00 | 0.000000E+00 | 0.000000E+00 | 0.000000E+00 |
| A4 | 1.953429E−02 | −1.689127E−01 | −2.602519E−01 | −1.739723E−01 | −1.747485E−01 | −1.375940E−01 |
| A6 | 2.120212E−02 | 1.463925E−01 | 4.018207E−01 | 4.626839E−01 | 2.973099E−01 | 4.170520E−01 |
| A8 | −6.474466E−02 | −2.879325E−03 | 1.609778E−01 | −3.621880E−01 | −1.222168E+00 | −1.776703E+00 |
| A10 | 7.315102E−02 | −1.933114E−01 | −1.060481E+00 | 2.565173E−01 | 3.165587E+00 | 3.842274E+00 |
| A12 | −6.475378E−02 | 1.118589E−01 | 1.167969E+00 | −2.403918E−01 | −4.818489E+00 | −4.648532E+00 |
| A14 | 0.000000E+00 | 0.000000E+00 | −4.300008E−01 | 1.388178E−01 | 4.019962E+00 | 2.953362E+00 |
| A16 | 0.000000E+00 | 0.000000E+00 | 0.000000E+00 | 0.000000E+00 | −1.357130E+00 | −7.412296E−01 |

| | 8th surface | 9th surface | 10th surface | 11th surface | 14th surface |
|---|---|---|---|---|---|
| k | 1.164757E+00 | −4.271132E+00 | 0.000000E+00 | −7.212934E+00 | 0.000000E+00 |
| A4 | 1.412364E−02 | −1.552894E−02 | −2.588333E−02 | −4.583988E−02 | 1.748333E−02 |
| A6 | 2.419513E−01 | 7.392099E−02 | −9.798219E−02 | 5.528229E−03 | −9.227672E−04 |
| A8 | −6.645284E−01 | −1.749808E−01 | 7.330350E−02 | 6.578103E−04 | −8.346137E−05 |
| A10 | 8.262092E−01 | 1.733064E−01 | −2.354904E−02 | −5.152735E−04 | 1.452021E−05 |
| A12 | −5.844667E−01 | −7.984353E−02 | 4.036259E−03 | 1.043230E−04 | −7.321519E−07 |
| A14 | 2.183089E−01 | 1.742246E−02 | −3.624041E−04 | −1.034742E−05 | 1.090017E−08 |
| A16 | −3.240118E−02 | −1.469344E−03 | 1.347021E−05 | 4.419441E−07 | 1.256415E−10 |

Example 41

Figure 7:
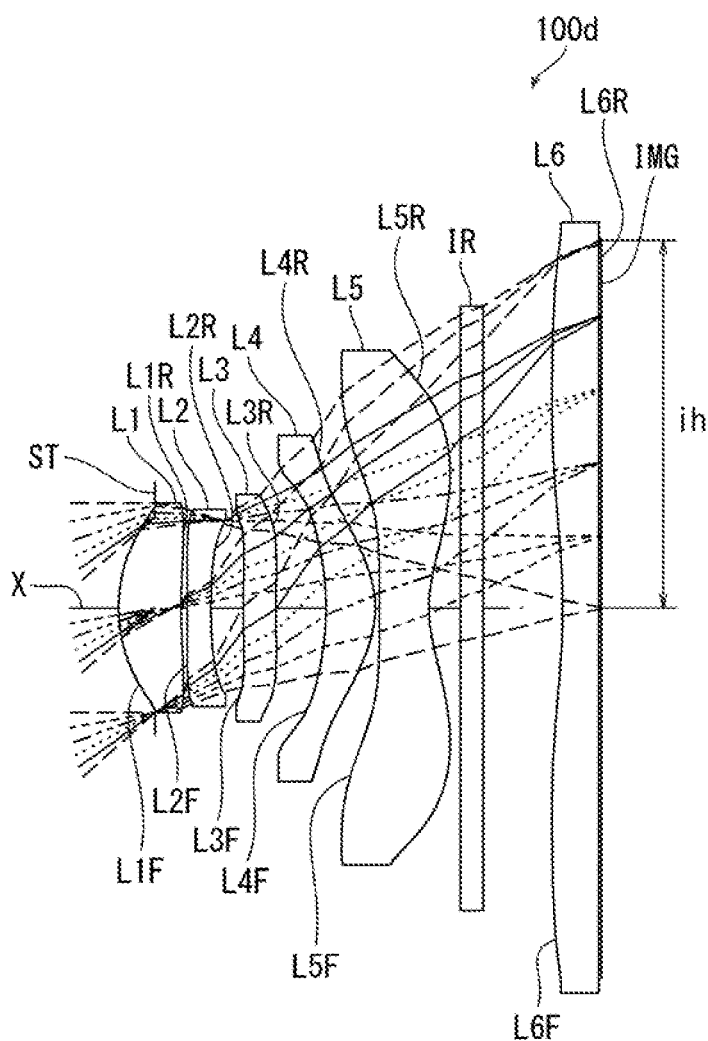
FIG. 7 is a cross-sectional view schematically illustrating a configuration of an image pickup lens in accordance with an embodiment of the present invention.

FIG. 7 is a cross-sectional view illustrating a configuration of an image pickup lens 100d in accordance with Example 4. An outline of the configuration of the image pickup lens 100d is similar to that of the configuration of the image pickup lens 100a illustrated in FIG. 1.

Figure 8:
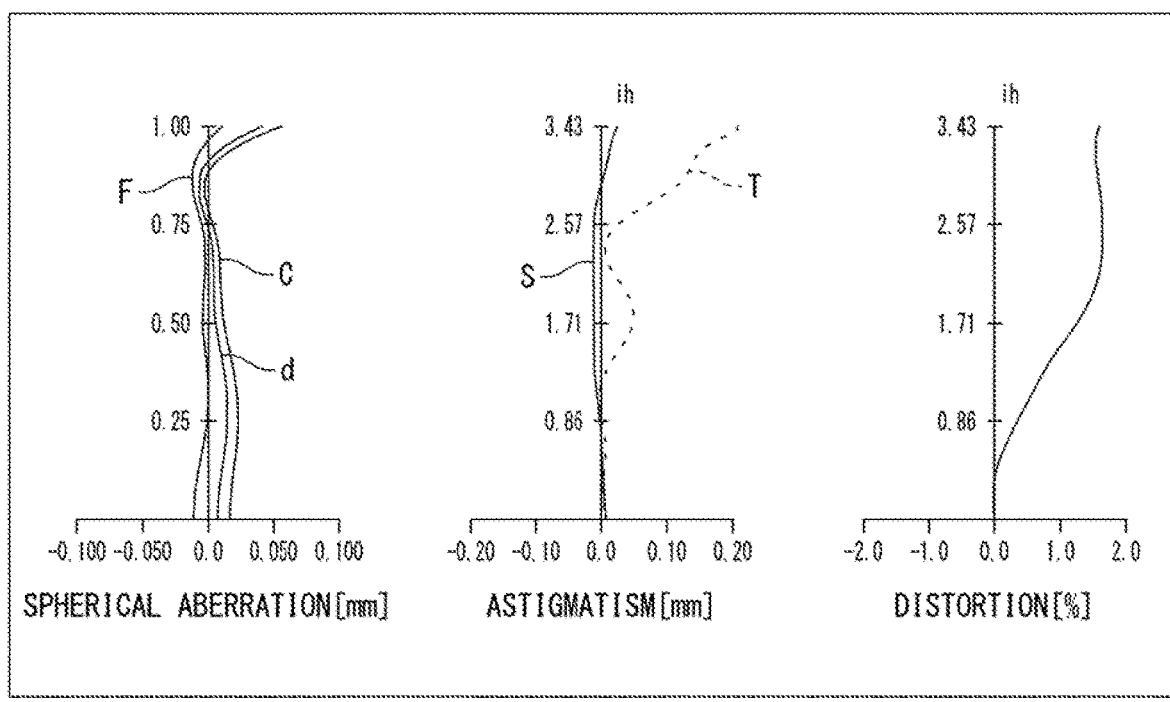
FIG. 8 is an aberration diagram illustrating various aberrations (spherical aberration, astigmatism, and distortion) of the image pickup lens illustrated in FIG. 7.

FIG. 8 is an aberration diagram illustrating various aberrations (spherical aberration, astigmatism, and distortion) of the image pickup lens 100d.

As is clear from FIG. 8, according to the image pickup lens 100d, various aberrations are successfully corrected.

Table 4 below shows a design formula of the image pickup lens 100d.

TABLE 4

Example 4
f = 3.81 mm
Fno = 1.94
ω = 41.5°
ih = 3.43 mm
TTL = 4.43 mm

Surface data

| Surface number i | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.3391 | | |
| 2* | 1.4000 | 0.5847 | 1.5443 | 55.86 |
| 3* | 5.8404 | 0.0556 | | |
| 4* | 57.1297 | 0.2200 | 1.6503 | 21.54 |
| 5* | 4.7340 | 0.3016 | | |
| 6* | 7.3135 | 0.3064 | 1.5348 | 55.66 |
| 7* | 13.0350 | 0.4640 | | |
| 8* | −2.8935 | 0.4602 | 1.5443 | 55.86 |
| 9* | −0.9009 | 0.0398 | | |
| 10* | −38.7214 | 0.4601 | 1.5348 | 55.66 |
| 11* | 1.1651 | 0.2983 | | |
| 12 | Infinity | 0.2100 | 1.5168 | 64.20 |
| 13 | Infinity | 0.7393 | | |
| 14* | −6.3012 | 0.3400 | 1.5348 | 55.66 |
| 15 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 3.23 (=f1) | | |
| 2 | 4 | −7.95 (=f2) | | |
| 3 | 6 | 30.58 (=f3) | | |
| 4 | 8 | 2.22 (=f4) | | |
| 5 | 10 | −2.11 (=f5) | | |
| 6 | 14 | −11.78 (=f6) | L6Fsag | −0.100 mm |

Aspheric surface data

| | 2nd surface | 3rd surface | 4th surface | 5th surface | 6th surface | 7th surface |
|---|---|---|---|---|---|---|
| k | −7.735858E−01 | 0.000000E+00 | 0.000000E+00 | 2.286363E+01 | 5.121546E+01 | 0.000000E+00 |
| A4 | 7.820558E−03 | −1.806918E−01 | −1.458350E−01 | −2.772016E−02 | −1.554182E−01 | −1.597621E−01 |
| A6 | 1.013161E−01 | 4.280997E−01 | 6.622666E−01 | 3.087291E−01 | −1.379971E−01 | 3.463652E−01 |
| A8 | −1.282611E−01 | −8.956432E−01 | −1.290469E+00 | 1.466159E−01 | 8.967375E−01 | −1.279605E+00 |
| A10 | −8.881009E−02 | 1.109800E+00 | 1.655731E+00 | −2.441146E+00 | −3.630127E+00 | 2.173426E+00 |
| A12 | 3.774228E−01 | −7.740740E−01 | −1.131347E+00 | 5.982576E+00 | 7.114816E+00 | −2.023319E+00 |
| A14 | −3.856298E−01 | 2.157429E−01 | 3.293624E−01 | −6.255380E+00 | −7.159600E+00 | 8.554315E−01 |
| A16 | 1.125468E−01 | −2.486641E−08 | 7.697740E−03 | 2.557918E+00 | 2.953821E+00 | −7.526724E−02 |

| | 8th surface | 9th surface | 10th surface | 11th surface | 14th surface |
|---|---|---|---|---|---|
| k | 0.000000E+00 | −4.031063E+00 | 0.000000E+00 | −9.102865E+00 | 0.000000E+00 |
| A4 | −8.528890E−02 | −5.194201E−02 | −3.089781E−03 | −7.087347E−02 | 2.364875E−02 |
| A6 | 4.318799E−01 | 5.989102E−02 | −1.511573E−01 | 2.067839E−02 | −2.968670E−03 |
| A8 | −1.022763E+00 | −1.097012E−01 | 1.321732E−01 | −5.760803E−03 | 1.318979E−04 |
| A10 | 1.359675E+00 | 1.501986E−01 | −5.079135E−02 | 1.132306E−03 | 6.835100E−06 |
| A12 | −1.088157E+00 | −8.980227E−02 | 1.038107E−02 | −1.551464E−04 | −7.856288E−07 |
| A14 | 4.568466E−01 | 2.407950E−02 | −1.101947E−03 | 1.025130E−05 | 1.824627E−08 |
| A16 | −7.496076E−02 | −2.418133E−03 | 4.782552E−05 | 0.000000E+00 | 0.000000E+00 |

Example 51

Figure 9:
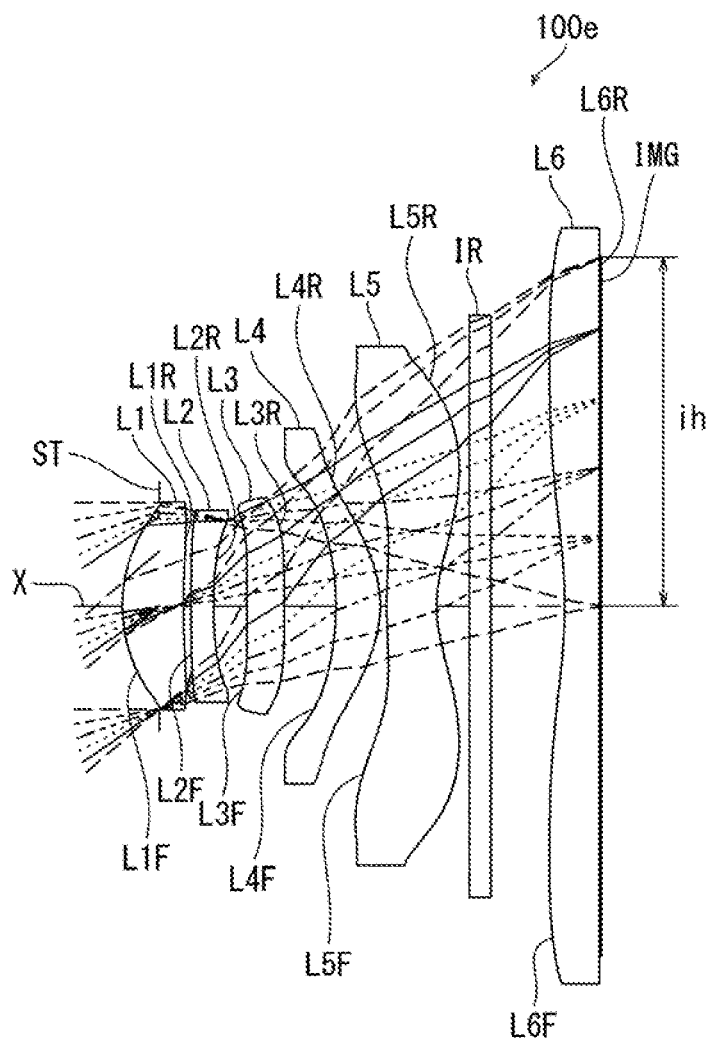
FIG. 9 is a cross-sectional view schematically illustrating a configuration of an image pickup lens in accordance with an embodiment of the present invention.

FIG. 9 is a cross-sectional view illustrating a configuration of an image pickup lens 100e in accordance with Example 5. An outline of the configuration of the image pickup lens 100e is similar to that of the configuration of the image pickup lens 100a illustrated in FIG. 1.

Figure 10:
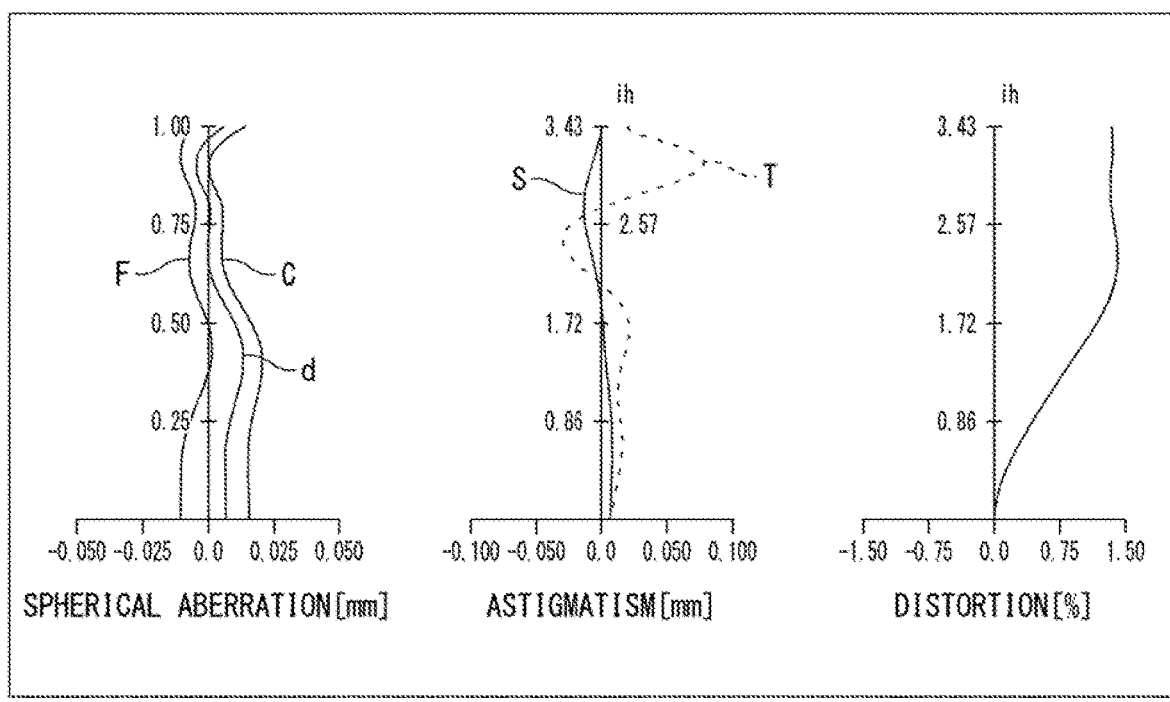
FIG. 10 is an aberration diagram illustrating various aberrations (spherical aberration, astigmatism, and distortion) of the image pickup lens illustrated in FIG. 9.

FIG. 10 is an aberration diagram illustrating various aberrations (spherical aberration, astigmatism, and distortion) of the image pickup lens 100e.

As is clear from FIG. 10, according to the image pickup lens 100e, various aberrations are successfully corrected.

Table 5 below shows a design formula of the image pickup lens 100e.

TABLE 5

Example 5
f = 3.96 mm
Fno = 1.94
ω = 40.5°
ih = 3.43 mm
TTL = 4.63 mm

Surface data

| Surface number i | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.3605 | | |
| 2* | 1.4822 | 0.6003 | 1.5443 | 55.86 |
| 3* | 6.9654 | 0.0739 | | |
| 4* | 14.5170 | 0.2200 | 1.6503 | 21.54 |
| 5* | 3.6454 | 0.3253 | | |
| 6* | 16.7617 | 0.3700 | 1.5348 | 55.66 |
| 7* | −40.1055 | 0.5066 | | |
| 8* | −2.6789 | 0.4338 | 1.5443 | 55.86 |
| 9* | −1.1335 | 0.0647 | | |
| 10* | 5.7982 | 0.4900 | 1.5348 | 55.66 |
| 11* | 1.2715 | 0.3204 | | |
| 12 | Infinity | 0.2100 | 1.5168 | 64.20 |
| 13 | Infinity | 0.7249 | | |
| 14* | −5.0688 | 0.3400 | 1.5348 | 55.66 |
| 15 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 3.33 (=f1) | | |
| 2 | 4 | −7.55 (=f2) | | |
| 3 | 6 | 22.15 (=f3) | | |
| 4 | 8 | 3.28 (=f4) | | |
| 5 | 10 | −3.16 (=f5) | | |
| 6 | 14 | −9.48 (=f6) | L6Fsag | −0.149 mm |

Aspheric surface data

| | 2nd surface | 3rd surface | 4th surface | 5th surface | 6th surface | 7th surface |
|---|---|---|---|---|---|---|
| k | −7.258868E−01 | 0.000000E+00 | 0.000000E+00 | 1.383915E+01 | 6.030071E+01 | 0.000000E+00 |
| A4 | 2.010536E−02 | −1.083129E−01 | −1.216047E−01 | −8.231056E−02 | −1.266753E−01 | −1.041428E−01 |
| A6 | 4.598823E−02 | 1.956202E−01 | 3.811572E−01 | 4.783715E−01 | −7.291678E−02 | 5.181238E−02 |
| A8 | −8.765802E−02 | −3.702047E−01 | −5.713462E−01 | −1.550730E+00 | 8.635787E−01 | −1.367315E−01 |
| A10 | 1.029925E−01 | 6.912813E−01 | 7.915984E−01 | 3.975351E+00 | −3.701416E+00 | −4.266249E−02 |
| A12 | −7.285853E−02 | −9.606793E−01 | −9.246998E−01 | −6.466159E+00 | 7.216027E+00 | 3.438470E−01 |
| A14 | 3.432288E−02 | 6.925155E−01 | 6.783978E−01 | 5.702728E+00 | −6.925473E+00 | −3.941735E−01 |
| A16 | −1.980244E−02 | −1.997640E−01 | −2.033564E−01 | −2.055490E+00 | 2.650943E+00 | 1.546324E−01 |

| | 8th surface | 9th surface | 10th surface | 11th surface | 14th surface |
|---|---|---|---|---|---|
| k | 0.000000E+00 | −4.983428E+00 | 0.000000E+00 | −7.398042E+00 | 0.000000E+00 |
| A4 | −8.733390E−03 | −1.196548E−01 | −1.282312E−01 | −7.150668E−02 | 2.657448E−02 |
| A6 | 1.348496E−01 | 1.661856E−01 | 1.053793E−02 | 2.321982E−02 | −2.735655E−03 |
| A8 | −4.060000E−01 | −2.202263E−01 | 1.244727E−02 | −6.598116E−03 | −2.150187E−05 |
| A10 | 5.347362E−01 | 1.906699E−01 | −3.484695E−03 | 1.192560E−03 | 3.109329E−05 |
| A12 | −3.994293E−01 | −8.546144E−02 | 1.762563E−04 | −1.310195E−04 | −2.449452E−06 |
| A14 | 1.538365E−01 | 1.866988E−02 | 3.912170E−05 | 6.778041E−06 | 6.146904E−08 |
| A16 | −2.293918E−02 | −1.592453E−03 | −4.003018E−06 | 0.000000E+00 | 0.000000E+00 |

Example 6

Figure 11:
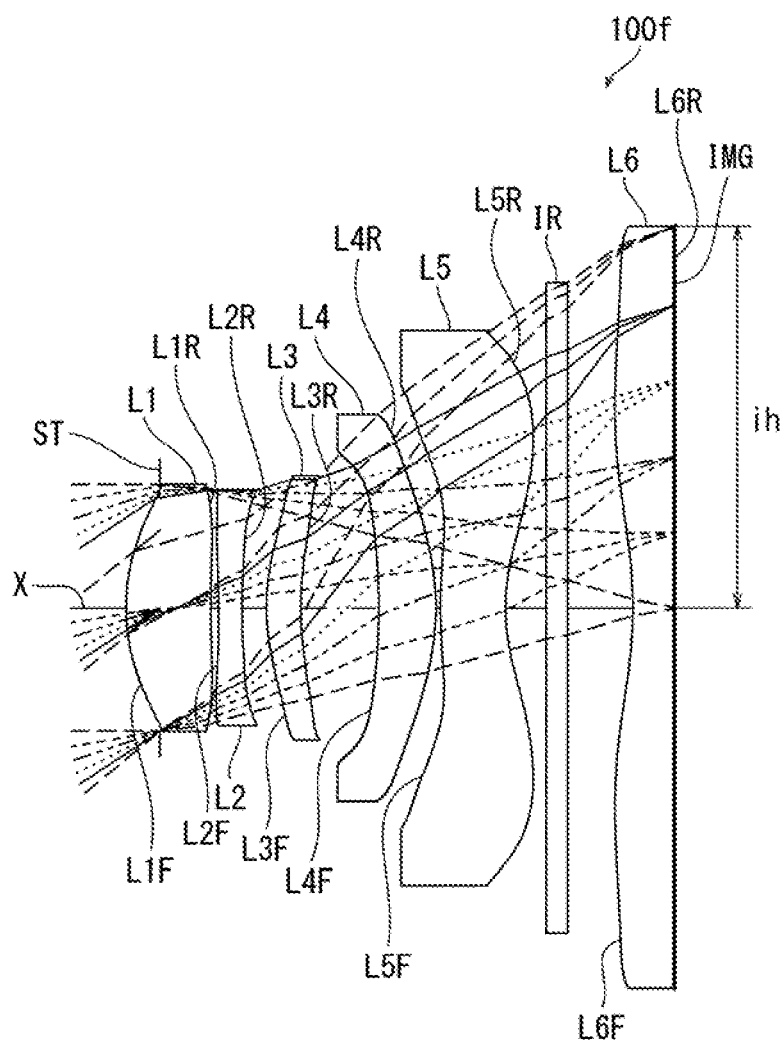
FIG. 11 is a cross-sectional view schematically illustrating a configuration of an image pickup lens in accordance with an embodiment of the present invention.

FIG. 11 is a cross-sectional view illustrating a configuration of an image pickup lens 100f in accordance with Example 6. An outline of the configuration of the image pickup lens 100f is similar to that of the configuration of the image pickup lens 100a illustrated in FIG. 1.

Figure 12:
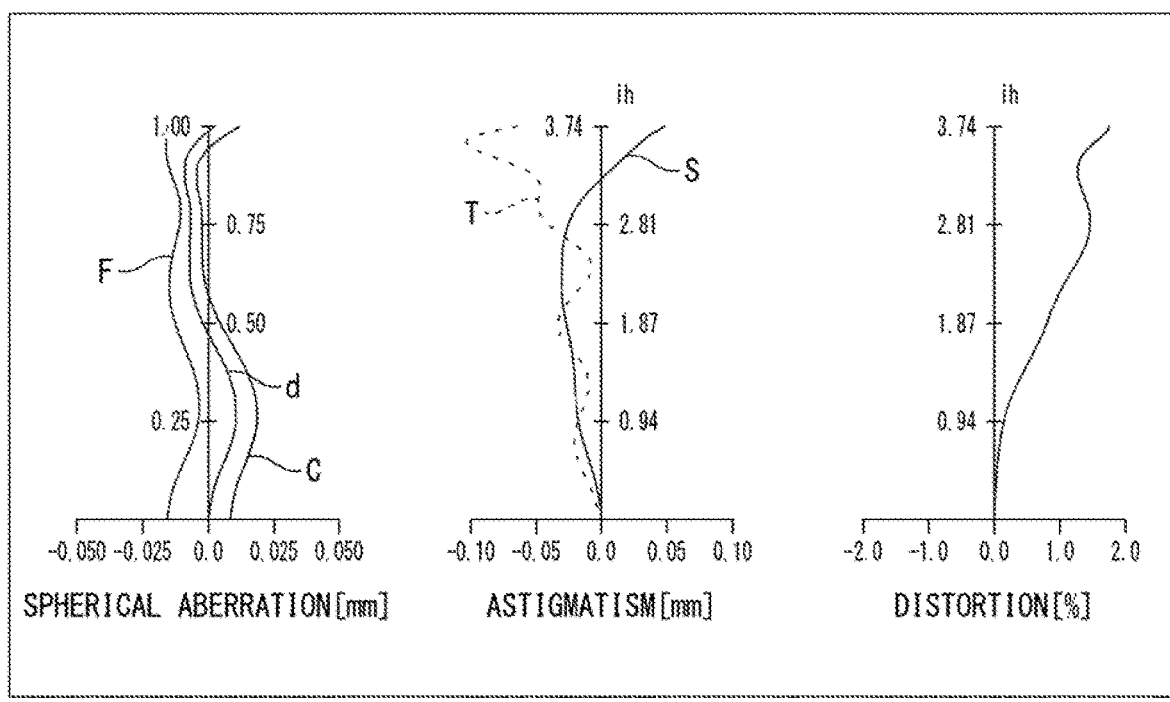
FIG. 12 is an aberration diagram illustrating various aberrations (spherical aberration, astigmatism, and distortion) of the image pickup lens illustrated in FIG. 11.

FIG. 12 is an aberration diagram illustrating various aberrations (spherical aberration, astigmatism, and distortion) of the image pickup lens 100f.

As is clear from FIG. 12, according to the image pickup lens 100f, various aberrations are successfully corrected.

Table 6 below shows a design formula of the image pickup lens 100f.

TABLE 6

Example 6
f = 4.47 mm
Fno = 1.84
ω = 39.4°
ih = 3.74 mm
TTL = 5.32 mm

Surface data

| Surface number i | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.3310 | | |
| 2* | 1.9671 | 0.8290 | 1.5443 | 55.86 |
| 3* | 6.7229 | 0.0800 | | |
| 4* | −96.8452 | 0.2310 | 1.6503 | 21.54 |
| 5* | 5.6857 | 0.2370 | | |
| 6* | 1.9658 | 0.3400 | 1.5348 | 55.66 |
| 7* | 3.5660 | 0.7630 | | |
| 8* | −5.5301 | 0.5610 | 1.5443 | 55.86 |
| 9* | −2.2414 | 0.0450 | | |
| 10* | 5.2755 | 0.6380 | 1.5348 | 55.66 |
| 11* | 1.8643 | 0.3993 | | |
| 12 | Infinity | 0.2100 | 1.5168 | 64.20 |
| 13 | Infinity | 0.6406 | | |
| 14* | −3.9589 | 0.3950 | 1.5348 | 55.66 |
| 15 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 4.81 (=f1) | | |
| 2 | 4 | −8.25 (=f2) | | |
| 3 | 6 | 7.63 (=f3) | | |
| 4 | 8 | 6.53 (=f4) | | |
| 5 | 10 | −5.77 (=f5) | | |
| 6 | 14 | −7.40 (=f6) | L6Fsag | −0.177 mm |

Aspheric surface data

| | 2nd surface | 3rd surface | 4th surface | 5th surface | 6th surface | 7th surface |
|---|---|---|---|---|---|---|
| k | −6.554083E−01 | 0.000000E+00 | 0.000000E+00 | 0.000000E+00 | 0.000000E+00 | 0.000000E+00 |
| A4 | 2.910972E−03 | −1.190573E−01 | −2.098850E−01 | −2.123274E−01 | −1.630617E−01 | −2.381408E−02 |
| A6 | −1.975126E−03 | 9.450389E−02 | 4.492841E−01 | 4.865837E−01 | 1.721073E−01 | −1.311605E−02 |
| A8 | −2.223977E−03 | −8.241565E−02 | −4.861341E−01 | −5.140692E−01 | −2.654728E−01 | 1.123472E−02 |
| A10 | −2.242683E−03 | 3.997493E−02 | 3.238840E−01 | 3.293532E−01 | 3.005246E−01 | −4.103204E−02 |
| A12 | −7.876830E−04 | −8.619196E−03 | −1.170813E−01 | −1.128444E−01 | −2.247849E−01 | 5.738538E−02 |
| A14 | 0.000000E+00 | 0.000000E+00 | 1.773051E−02 | 1.567284E−02 | 9.434337E−02 | −3.568078E−02 |
| A16 | 0.000000E+00 | 0.000000E+00 | 0.000000E+00 | 0.000000E+00 | −1.575327E−02 | 9.130114E−03 |

| | 8th surface | 9th surface | 10th surface | 11th surface | 14th surface |
|---|---|---|---|---|---|
| k | 3.492225E+00 | −3.686693E+00 | 0.000000E+00 | −2.719974E+00 | 0.000000E+00 |
| A4 | 5.167925E−02 | 8.351729E−02 | −2.037129E−02 | −7.212080E−02 | 3.444210E−02 |
| A6 | −8.446293E−02 | −1.083386E−01 | −1.066040E−01 | 1.641875E−02 | −3.530545E−03 |
| A8 | 1.412327E−01 | 5.349889E−02 | 7.414793E−02 | −1.699682E−03 | 1.293996E−04 |
| A10 | −1.882096E−01 | −2.278143E−03 | −2.329516E−02 | −2.293455E−04 | 1.078060E−05 |
| A12 | 1.394353E−01 | −6.803590E−03 | 4.016764E−03 | 9.382161E−05 | −1.010446E−06 |
| A14 | −5.324690E−02 | 2.257518E−03 | −3.664283E−04 | −1.175975E−05 | 4.671891E−09 |
| A16 | 7.979448E−03 | −2.303553E−04 | 1.336379E−05 | 5.488067E−07 | 1.287345E−09 |

Example 7

Figure 13:
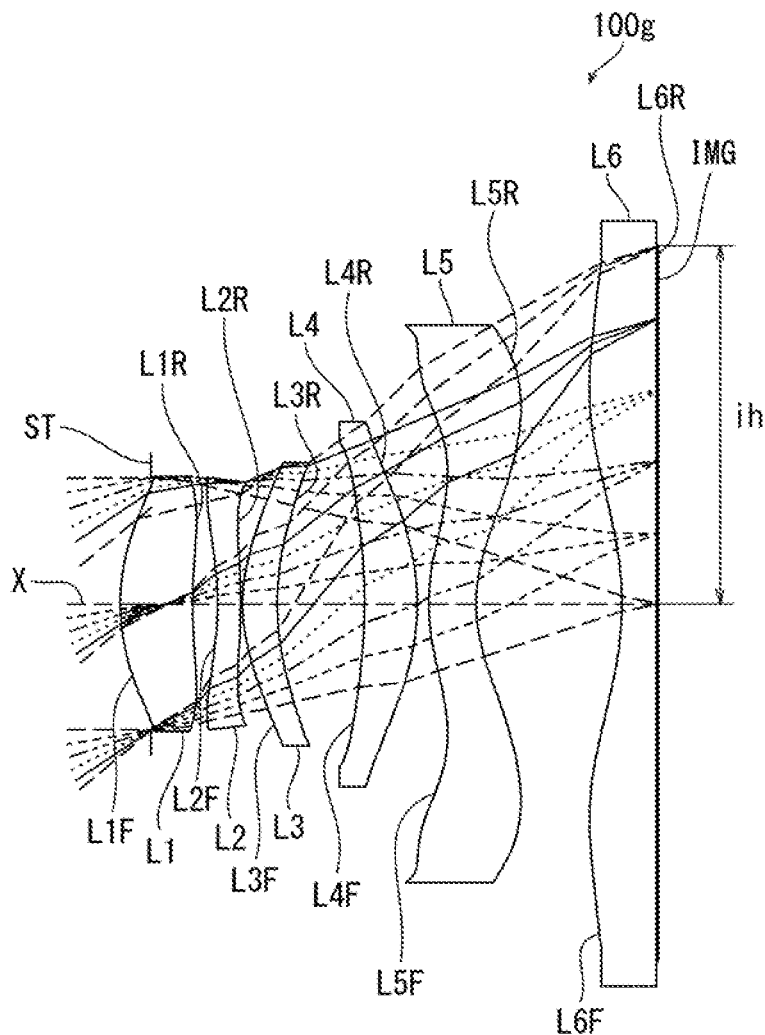
FIG. 13 is a cross-sectional view schematically illustrating a configuration of an image pickup lens in accordance with an embodiment of the present invention.

FIG. 13 is a cross-sectional view illustrating a configuration of an image pickup lens 100g in accordance with Example 7. The image pickup lens 100g illustrated in FIG. 13 does not include an infrared cut filter IR. An outline of the configuration of the image pickup lens 100g is similar to that of the configuration of the image pickup lens 100a illustrated in FIG. 1, except that the image pickup lens 100g does not include an infrared cut filter IR.

Figure 14:
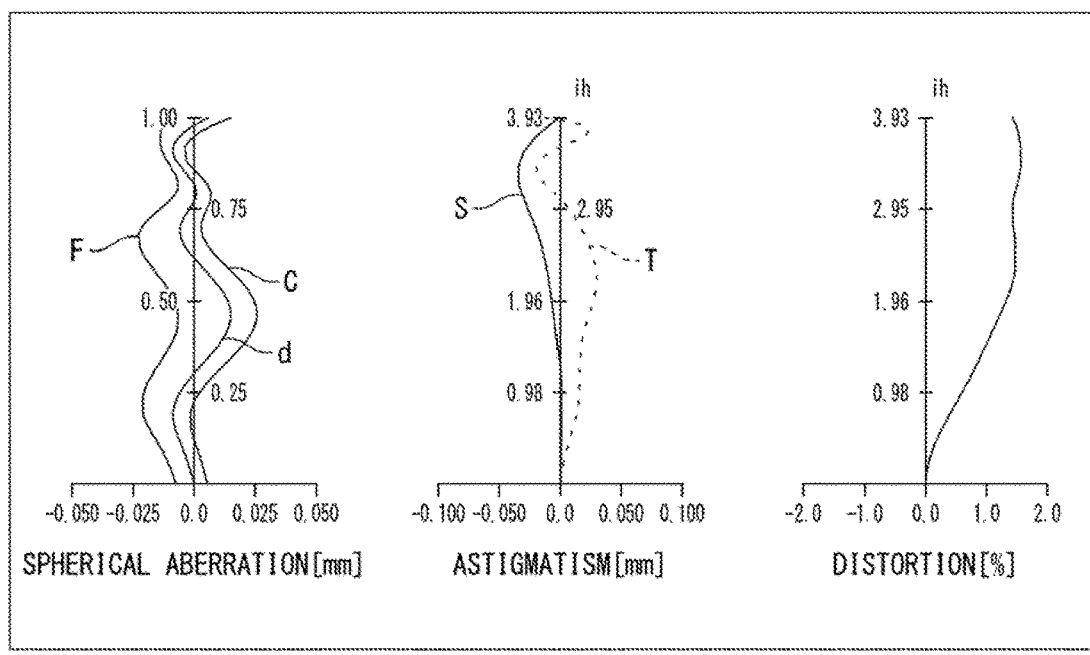
FIG. 14 is an aberration diagram illustrating various aberrations (spherical aberration, astigmatism, and distortion) of the image pickup lens illustrated in FIG. 13.

FIG. 14 is an aberration diagram illustrating various aberrations (spherical aberration, astigmatism, and distortion) of the image pickup lens 100g.

As is clear from FIG. 14, according to the image pickup lens 100g, various aberrations are successfully corrected.

Table 7 below shows a design formula of the image pickup lens 100g.

TABLE 7

Example 7
f = 4.64 mm
Fno = 1.67
ω = 39.9°
ih = 3.93 mm
TTL = 5.90 mm

Surface data

| Surface number i | Radius of curvature r (mm) | Surface distance d (mm) | Refractive index Nd | Abbe number vd |
|---|---|---|---|---|
| (Object surface) | Infinity | Infinity | | |
| 1 (Stop) | Infinity | −0.3328 | | |
| 2* | 2.3329 | 0.7925 | 1.5443 | 55.86 |
| 3* | 6.2249 | 0.2748 | | |
| 4* | −2.6344 | 0.2500 | 1.6503 | 21.54 |
| 5* | −6.4133 | 0.0214 | | |
| 6* | 1.6680 | 0.3826 | 1.5348 | 55.66 |
| 7* | 3.0229 | 0.9571 | | |
| 8* | −5.3309 | 0.5765 | 1.5443 | 55.86 |
| 9* | −2.6554 | 0.1269 | | |
| 10* | 2.2201 | 0.5207 | 1.5348 | 55.66 |
| 11* | 1.7267 | 1.5946 | | |
| 12* | −3.6049 | 0.3800 | 1.5348 | 55.66 |
| 13 | Infinity | 0.0200 | | |
| (Image plane) | Infinity | | | |

Standard wavelength 587.6 nm
Single lens data

| Lens | Initial surface | Focal length (mm) | | |
|---|---|---|---|---|
| 1 | 2 | 6.40 (=f1) | | |
| 2 | 4 | −7.06 (=f2) | | |
| 3 | 6 | 6.34 (=f3) | | |
| 4 | 8 | 9.03 (=f4) | | |
| 5 | 10 | −22.98 (=f5) | | |
| 6 | 12 | −6.74 (=f6) | L6Fsag | −0.355 mm |

Aspheric surface data

| | 2nd surface | 3rd surface | 4th surface | 5th surface | 6th surface | 7th surface |
|---|---|---|---|---|---|---|
| k | −1.348515E+00 | 0.000000E+00 | −3.616705E+01 | 0.000000E+00 | −1.035439E+01 | 0.000000E+00 |
| A4 | 8.894488E−03 | −1.123399E−02 | 2.360309E−02 | 7.344311E−02 | 5.095691E−02 | −4.927196E−03 |
| A6 | −9.945301E−03 | −2.356420E−02 | −4.110776E−02 | −8.032723E−02 | −3.582748E−02 | −8.336650E−03 |
| A8 | 8.198805E−03 | −1.545397E−02 | 2.992145E−02 | 9.169689E−02 | 1.220089E−02 | 1.741552E−04 |
| A10 | −5.736646E−03 | 1.529129E−02 | −4.943720E−03 | 3.871502E−02 | −1.438264E−03 | 7.569007E−04 |
| A12 | 7.481260E−04 | −3.205982E−03 | −5.135495E−05 | 5.825010E−03 | 0.000000E+00 | 0.000000E+00 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | 8th surface | 9th surface | 10th surface | 11th surface | 12th surface |
|---|---|---|---|---|---|
| k | 0.000000E+00 | −1.815971E+00 | −1.729490E+00 | −9.717273E−01 | −2.505412E−01 |
| A4 | 3.424217E−02 | 7.189368E−03 | −6.654892E−02 | −7.372995E−02 | 1.235391E−02 |
| A6 | −2.255313E−02 | −7.762320E−03 | 8.283184E−03 | 1.287795E−02 | 2.245227E−03 |
| A8 | 9.500946E−03 | 3.830381E−03 | −1.256518E−03 | −1.887780E−03 | −4.452478E−04 |
| A10 | −2.132778E−03 | −4.674400E−04 | 1.992300E−04 | 1.948743E−04 | 3.479640E−05 |
| A12 | 1.359636E−04 | 0.000000E+00 | −1.121596E−05 | −1.305177E−05 | −1.365749E−06 |
| A14 | 0.000000E+00 | 0.000000E+00 | 0.000000E+00 | 4.089193E−07 | 2.430554E−08 |
| A16 | 0.000000E+00 | 0.000000E+00 | 0.000000E+00 | 0.000000E+00 | 0.000000E+00 |

Summary of Examples 1 Through 7

With regard to Examples 1 through 7 (that is, the image pickup lenses 100a through 100g), Table 8 shows the following values.

|L6Fsag|/D6 (see the conditional expression (1))
T5/ih (see the conditional expression (2))
f1/f (see the conditional expression (3))
f2/f (see the conditional expression (4))
|f3/f| (see the conditional expression (5))
f1/f4 (see the conditional expression (6))
(f5+f6)/f (see the conditional expression (7))
vd1 (see the conditional expression (8))
vd2 (see the conditional expression (9))
TTL/2ih (see the conditional expression (10))

TABLE 8

|  | Example 1 | Example 2 | Example 3 | Example 4 | Example 5 | Example 6 | Example 7 |
|---|---|---|---|---|---|---|---|
| \|L6Fsag\|/D6 | 0.45 | 0.46 | 0.36 | 0.29 | 0.44 | 0.45 | 0.93 |
| T5/ih | 0.37 | 0.37 | 0.33 | 0.34 | 0.35 | 0.31 | 0.41 |
| f1/f | 0.93 | 0.97 | 0.98 | 0.85 | 0.84 | 1.08 | 1.38 |
| f2/f | −2.35 | −2.53 | −2.22 | −2.09 | −1.91 | −1.84 | −1.52 |
| \|f3/f\| | 23.63 | 16.98 | 3.17 | 8.03 | 5.60 | 1.71 | 1.37 |
| f1/f4 | 1.13 | 0.94 | 1.19 | 1.45 | 1.01 | 0.74 | 0.71 |
| (f5 + f6)/f | −3.61 | −3.73 | −3.58 | −3.65 | −3.20 | −2.94 | −6.41 |
| vd1 | 55.57 | 55.86 | 55.86 | 55.86 | 55.86 | 55.86 | 55.86 |
| vd2 | 23.25 | 21.54 | 21.54 | 21.54 | 21.54 | 21.54 | 21.54 |
| TTL/2ih | 0.72 | 0.73 | 0.62 | 0.65 | 0.67 | 0.71 | 0.75 |

With regard to Examples 1 through 7, Table 9 shows, in detail, comparison of the configurations of the image pickup lenses 100a through 100g. Note that, in Table 9, "PL" means a planar surface, and "AS" means an aspheric surface. Furthermore, in Table 9, "pol" means including an aspheric surface having, at a position apart from an optical axis X, such a pole that a tangent plane at the pole is perpendicular to the optical axis X.

TABLE 9

| Ex No. | ST Position STO | Refractive Power Arrangement L1 | L2 | L3 | L4 | L5 | L6 | L1 L1F | L1R | L2 L2F | L2R | L3 L3F | L3R | L4 L4F | L4R |
|---|---|---|---|---|---|---|---|---|---|---|---|---|---|---|---|
| Ex 1 | Front Stop | POS | NEG | POS | POS | NEG | NEG | CX | CC | CX | CC | CX | CC | CC | CX |
| Ex 2 | Front Stop | POS | NEG | POS | POS | NEG | NEG | CX | CC | CX | CC | CX | CC | CC | CX |
| Ex 3 | Front Stop | POS | NEG | POS | POS | NEG | NEG | CX | CC | CX | CC | CX | CC | CC | CX |
| Ex 4 | Front Stop | POS | NEG | POS | POS | NEG | NEG | CX | CC | CX | CC | CX | CC | CC | CX |
| Ex 5 | Front Stop | POS | NEG | POS | POS | NEG | NEG | CX | CC | CX | CC | CX | CX | CC | CX |
| Ex 6 | Front Stop | POS | NEG | POS | POS | NEG | NEG | CX | CC | CC | CC | CX | CC | CC | CX |
| Ex 7 | Front Stop | POS | NEG | POS | POS | NEG | NEG | CX | CC | CC | CX | CX | CC | CC | CX |

| Ex No. | L5 L5F | L5R | L6 L6F | L6R | L1 POS | L5 NEG | L6 NEG | L2 AS | L3 AS | L4 AS | L5 AS | L1F CX | L6F CC | L6F AS | L6R PL |
|---|---|---|---|---|---|---|---|---|---|---|---|---|---|---|---|
| Ex 1 | CX | CC | CC | PL | POS | NEG | NEG | AS | AS | AS | AS | CX | CC | AS | PL |
| Ex 2 | CX | CC | CC | PL | POS | NEG | NEG | AS | AS | AS | AS | CX | CC | AS | PL |
| Ex 3 | CX | CC | CC | PL | POS | NEG | NEG | AS | AS | AS | AS | CX | CC | AS | PL |
| Ex 4 | CC | CC | CC | PL | POS | NEG | NEG | AS | AS | AS | AS | CX | CC | AS | PL |
| Ex 5 | CX | CC | CC | PL | POS | NEG | NEG | AS | AS | AS | AS | CX | CC | AS | PL |
| Ex 6 | CX | CC | CC | PL | POS | NEG | NEG | AS | AS | AS | AS | CX | CC | AS | PL |
| Ex 7 | CX | CC | CC | PL | POS | NEG | NEG | AS | AS | AS | AS | CX | CC | AS | PL |

| Ex No. | L6R-IMG Distance | Conditional Expression (1) \|L6Fsag\|/D6 | Conditional Expression (2) T5/ih | L2 | L3F | L3 | L4R | L4 | L5R | L5R pol | Conditional Expression (3) f1/f |
|---|---|---|---|---|---|---|---|---|---|---|---|
| Ex 1 | 0.02 | 0.45 | 0.37 | NEG | CX | POS | CX | POS | CC | YES | 0.93 |
| Ex 2 | 0.02 | 0.46 | 0.37 | NEG | CX | POS | CX | POS | CC | YES | 0.97 |
| Ex 3 | 0.02 | 0.36 | 0.33 | NEG | CX | POS | CX | POS | CC | YES | 0.98 |
| Ex 4 | 0.02 | 0.29 | 0.34 | NEG | CX | POS | CX | POS | CC | YES | 0.85 |
| Ex 5 | 0.02 | 0.44 | 0.35 | NEG | CX | POS | CX | POS | CC | YES | 0.84 |
| Ex 6 | 0.02 | 0.45 | 0.31 | NEG | CX | POS | CX | POS | CC | YES | 1.08 |
| Ex 7 | 0.02 | 0.93 | 0.41 | NEG | CX | POS | CX | POS | CC | YES | 1.38 |
| Minimum Value | 0.020 | 0.293 | 0.315 |  |  |  |  |  |  |  | 0.842 |

TABLE 9-continued

| | | | | | | | |
|---|---|---|---|---|---|---|---|
| Average Value | 0.020 | 0.483 | 0.355 | | | | 1.003 |
| Maximum Value | 0.020 | 0.933 | 0.406 | | | | 1.379 |
| Lower Limit −30% | 0.014 | 0.2 | 0.2 | | | | 0.6 |
| Upper Limit +30% | 0.026 | 1.2 | 0.5 | | | | 1.8 |
| Lower Limit −20% | 0.016 | 0.25 | 0.25 | | | | 0.70 |
| Upper Limit +20% | 0.024 | 1.10 | 0.45 | | | | 1.70 |

| Ex No. | Conditional Expression (4) f2/f | Conditional Expression (5) f3/f | Conditional Expression (6) f1/f4 | Conditional Expression (7) (f5 + f6)/f | Conditional Expression (8) ν1 | Conditional Expression (9) ν2 | Conditional Expression (10) TTL/2ih |
|---|---|---|---|---|---|---|---|
| Ex 1 | −2.35 | 23.63 | 1.13 | −3.61 | 55.57 | 23.25 | 0.72 |
| Ex 2 | −2.53 | 16.98 | 0.94 | −3.73 | 55.86 | 21.54 | 0.73 |
| Ex 3 | −2.22 | 3.17 | 1.19 | −3.58 | 55.86 | 21.54 | 0.62 |
| Ex 4 | −2.09 | 8.03 | 1.45 | −3.65 | 55.86 | 21.54 | 0.65 |
| Ex 5 | −1.91 | 5.60 | 1.01 | −3.20 | 55.86 | 21.54 | 0.67 |
| Ex 6 | −1.84 | 1.71 | 0.74 | −2.94 | 55.86 | 21.54 | 0.71 |
| Ex 7 | −1.52 | 1.37 | 0.71 | −6.41 | 55.86 | 21.54 | 0.75 |
| Minimum Value | −2.526 | 1.366 | 0.708 | −6.408 | 55.57 | 21.54 | 0.62 |
| Average Value | −2.065 | 8.641 | 1.025 | −3.874 | 55.82 | 21.78 | 0.69 |
| Maximum Value | −1.522 | 23.630 | 1.455 | −2.945 | 55.86 | 23.25 | 0.75 |
| Lower Limit −30% | −3.3 | 1.0 | 0.5 | −8.3 | — | — | 0.5 |
| Upper Limit +30% | −1.1 | 30.7 | 1.9 | −2.1 | — | — | 0.9 |
| Lower Limit −20% | −3.00 | 1.20 | 0.60 | −7.70 | — | — | 0.55 |
| Upper Limit +20% | −1.20 | — | 1.70 | −2.40 | — | — | 0.80 |

*Abbreviations:
Ex stands for "Example."
POS stands for "positive."
NEG stands for "negative."
CX stands for "convex."
CC stands for "concave."
PL stands for "planar surface."
AS stands for "aspheric surface."

[Recap]

An image pickup lens in accordance with Aspect 1 of the present invention is an image pickup lens which causes an image of an object to be formed on an image pickup plane of an image pickup device, the image pickup lens including: a first lens; a second lens; a third lens; a fourth lens; a fifth lens; and a sixth lens, the first lens, the second lens, the third lens, the fourth lens, the fifth lens, and the sixth lens being arranged in this order from an object side toward an image plane side, the first lens having positive refractive power, the fifth lens and the sixth lens each having negative refractive power, an object-side surface of the first lens being a convex surface, at least one of an object-side surface and an image plane-side surface of each of the second lens, the third lens, the fourth lens, and the fifth lens being an aspheric surface, an object-side surface of the sixth lens being a concave surface and being an aspheric surface, an image plane-side surface of the sixth lens being an optically planar surface throughout a region corresponding to an effective diameter of the image plane-side surface of the sixth lens.

According to the above configuration, since the first lens has positive refractive power and the fifth lens and the sixth lens each have negative refractive power, the image pickup lens has a telephotographic characteristic and has a shorter optical overall length.

Each of the second lens, the third lens, the fourth lens, and the fifth lens is allocated suitable refractive power, and at least one of the object-side surface and the image plane-side surface of each of the second lens, the third lens, the fourth lens, and the fifth lens is an aspheric surface. This makes it possible to correct spherical aberration, chromatic aberration, coma aberration, astigmatism, and distortion of the image pickup lens.

The object-side surface of the sixth lens is designed to be such an aspheric surface that a chief ray is incident on the image pickup plane at a suitable angle.

Since the image plane-side surface of the sixth lens is an optically planar surface, it is possible to arrange the sixth lens so that the image plane-side surface and the image pickup plane are close to each other or located at an identical position. Therefore, according to the above configuration, it is possible to cause a back focus to have an extremely small value and, accordingly, possible to make the optical overall length of the image pickup lens shorter.

The image pickup lens in accordance with Aspect 2 of the present invention can be arranged such that, in Aspect 1, in a case where it is assumed that the first lens, the second lens, the third lens, the fourth lens, and the fifth lens constitute a first group and the sixth lens constitutes a second group, the first group is movable along an optical axis of the image pickup lens.

The image pickup lens in accordance with Aspect 3 of the present invention can be arranged such that, in Aspect 1 or 2, in a case where it is assumed that the first lens, the second lens, the third lens, the fourth lens, and the fifth lens constitute a first group and the sixth lens constitutes a second group, the first group is movable in a direction parallel to the image pickup plane.

According to the above configuration, by (i) unitizing the first through fifth lenses and (ii) unitizing the sixth lens and the image pickup device, it is possible to form an image pickup module having an autofocus function, an image stabilization function, or both of the autofocus function and the image stabilization function. In this case, a single lens and a structure which holds the sixth lens so that the sixth lens is movable become unnecessary. Therefore, it is possible to reduce a weight by a weight of the single lens and a weight of the structure, as compared with a conventional configuration in which the first through sixth lenses are integrally moved. It is therefore possible to reduce electric power consumed by an actuator which realizes the autofocus function and/or the image stabilization function. In particular, in a mobile terminal, it is possible to suppress consumption of a battery.

In a case where it is intended that a height of the image pickup lens, which focuses on the telephotographic characteristic, is reduced, a diameter of the sixth lens is dependent on an area of the image pickup plane, and is likely to be greater than a diameter of each of the first through fifth lenses. According to a conventional technique, in a case where the first through sixth lenses are put in a single lens barrel, there is no other choice but to make an outer diameter of the lens barrel greater than an outer diameter of the sixth lens. However, according to the above configuration, the first through fifth lenses are unitized. Therefore, it is possible to reduce a diameter of the lens barrel, as compared with a conventional image pickup module including six lenses.

The image pickup lens in accordance with Aspect 4 of the present invention can be arranged such that, in any of Aspects 1 through 3, a distance between the image plane-side surface of the sixth lens and the image pickup plane is not more than 0.1 mm.

According to the above configuration, by causing the sixth lens to be close to the image pickup plane, it becomes easier to correct an aberration in a periphery while suppressing an effect of an aberration on the optical axis of the image pickup lens.

The image pickup lens in accordance with Aspect 5 of the present invention can be arranged such that, in any of Aspects 1 through 4, the image pickup lens satisfies the following conditional expression (1):

$$|L6Fsag|/D6<1.2 \qquad (1)$$

where: L6Fsag represents a maximum value of an aspheric surface sag amount of the object side-surface of the sixth lens; and D6 represents a thickness, along an optical axis of the image pickup lens, of the sixth lens.

The conditional expression (1) defines a shape of the sixth lens. By satisfying a range represented by the conditional expression (1), it is possible to suppress an increase in thickness deviation ratio of the sixth lens, and possible to cause flowability of the sixth lens during molding to be good.

The image pickup lens in accordance with Aspect 6 of the present invention can be arranged such that, in any of Aspects 1 through 5, the image pickup lens satisfies the following conditional expression (2):

$$0.2<T5/ih<0.5 \qquad (2)$$

where: T5 represents a distance, along an optical axis of the image pickup lens, between the image plane-side surface of the fifth lens and the object-side surface of the sixth lens; and ih represents a maximum image height.

The conditional expression (2) is a condition for appropriately defining a distance between the fifth lens and the sixth lens so that a CRA is appropriately controlled and various aberrations are successfully corrected. In a case where a member, such as an infrared cut filter, is arranged between the fifth lens and the sixth lens, the conditional expression (2) is also a condition for securing a space in which the member is arranged. By satisfying a range represented by the conditional expression (2), it is possible to successfully control a CRA and successfully correct various aberrations, while reducing the height of the image pickup lens.

The image pickup lens in accordance with Aspect 7 of the present invention can be arranged such that, in any of Aspects 1 through 6, the second lens has negative refractive power.

According to the above configuration, by causing the second lens to have negative refractive power, it becomes easier to correct spherical aberration and chromatic aberration each caused by the first lens.

The image pickup lens in accordance with Aspect 8 of the present invention can be arranged such that, in any of Aspects 1 through 7, the object-side surface of the third lens is a convex surface; and each of the object-side surface and the image plane-side surface of the third lens is an aspheric surface.

According to the above configuration, by causing (i) the object-side surface of the third lens to be a convex surface and (ii) each of the object-side surface and the image plane-side surface of the third lens to be an aspheric surface, it becomes easier to correct field curvature, higher-order spherical aberration, and coma aberration.

The image pickup lens in accordance with Aspect 9 of the present invention can be arranged such that, in any of Aspects 1 through 8, the image plane-side surface of the fourth lens is a convex surface; the fourth lens has positive refractive power; and each of the object-side surface and the image plane-side surface of the fourth lens is an aspheric surface.

According to the above configuration, by causing (i) the image plane-side surface of the fourth lens to be a convex surface and (ii) each of the object-side surface and the image plane-side surface of the fourth lens to be an aspheric surface, it is possible to guide light rays, which are caused to exit from the fourth lens, to the fifth lens at a small angle of refraction throughout a region ranging from a vicinity of the optical axis of the image pickup lens to a periphery. As a result, according to the above configuration, it becomes easier to correct various aberrations. Furthermore, by causing the object-side surface of the fourth lens to be an aspheric surface, it becomes easier to correct astigmatism and field curvature. Moreover, by (i) designing the fourth lens to have positive refractive power and (ii) arranging the first lens and the fourth lens in a balanced manner, it becomes possible to make the optical overall length of the image pickup lens shorter.

The image pickup lens in accordance with Aspect 10 of the present invention can be arranged such that, in any of Aspects 1 through 9, the image plane-side surface of the fifth lens is a concave surface; and the image plane-side surface of the fifth lens includes an aspheric surface having, at a position apart from an optical axis of the image pickup lens, such a pole that a tangent plane at the pole is perpendicular to the optical axis.

According to the above configuration, by causing the image plane-side surface of the fifth lens to be a concave surface and to be an aspheric surface having, at a position apart from the optical axis of the image pickup lens, such a pole that a tangent plane at the pole is perpendicular to the optical axis, it is possible to easily (i) correct field curvature and distortion and (ii) cause the sixth lens to control a CRA, while maintaining the telephotographic characteristic.

The image pickup lens in accordance with Aspect 11 of the present invention can be arranged such that, in any of Aspects 1 through 10, the image pickup lens satisfies the following conditional expressions (3) and (4):

$$0.6 < f1/f < 1.8 \tag{3}$$

$$-3.3 < f2/f < -1.0 \tag{4}$$

where: f represents a focal length of the image pickup lens; f1 represents a focal length of the first lens; and f2 represents a focal length of the second lens.

The conditional expression (3) defines the focal length of the first lens with respect to the focal length of the image pickup lens. The conditional expression (4) defines the focal length of the second lens with respect to the focal length of the image pickup lens. The conditional expressions (3) and (4) are each a condition effective in reducing the height of the image pickup lens and in correcting spherical aberration and chromatic aberration of the image pickup lens.

In a case where f1/f exceeds an upper limit shown in the conditional expression (3), refractive power of the first lens becomes relatively weak. This is disadvantageous for reducing the height of the image pickup lens.

In a case where f1/f falls below a lower limit shown in the conditional expression (3), the refractive power of the first lens becomes excessively strong. This is not favorable because a rate of occurrence of spherical aberration and chromatic aberration of the image pickup lens is increased and sensitivity of the image pickup lens with respect to manufacturing tolerance is increased.

In a case where f2/f exceeds an upper limit shown in the conditional expression (4), the negative refractive power of the second lens becomes weak. This results in insufficient correction of spherical aberration and chromatic aberration of the image pickup lens.

In a case where f2/f falls below a lower limit shown in the conditional expression (4), the negative refractive power of the second lens becomes excessively strong. This is not favorable because this results in excessive correction of spherical aberration and chromatic aberration of the image pickup lens and makes coma aberration of the image pickup lens worse.

The image pickup lens in accordance with Aspect 12 of the present invention can be arranged such that, in any of Aspects 1 through 11, the image pickup lens satisfies the following conditional expression (5):

$$1.0 < |f3/f| \tag{5}$$

where: f represents a focal length of the image pickup lens; and f3 represents a focal length of the third lens.

The conditional expression (5) defines the focal length of the third lens with respect to the focal length of the image pickup lens. By satisfying a range represented by the conditional expression (5), it is possible to keep refractive power in a paraxial region of the third lens weak, and possible to suppress occurrence of chromatic aberration, on the optical axis of the image pickup lens, of the third lens.

The image pickup lens in accordance with Aspect 13 of the present invention can be arranged such that, in any of Aspects 1 through 12, the image pickup lens satisfies the following conditional expression (6):

$$0.5 < f1/f4 < 2.0 \tag{6}$$

where: f1 represents a focal length of the first lens; and f4 represents a focal length of the fourth lens.

The conditional expression (6) is a condition for optimizing balance between the focal length of the first lens and the focal length of the fourth lens so that a distance, along the optical axis of the image pickup lens, between the fifth lens and the image pickup plane is optimized and occurrence of an aberration is suppressed, while the height of the image pickup lens is reduced.

In a case where f1/f4 exceeds an upper limit shown in the conditional expression (6), the refractive power of the first lens becomes relatively weak, and refractive power of the fourth lens becomes relatively strong. This causes a position of a principal point of the image pickup lens to move toward an image plane side and, ultimately, causes the optical overall length of the image pickup lens to be longer. Furthermore, in this case, it is likely that higher-order spherical aberration occurs in the fourth lens.

In a case where f1/f4 falls below a lower limit shown in the conditional expression (6), the refractive power of the first lens becomes relatively strong, and the refractive power of the fourth lens becomes relatively weak. Consequently, it is likely that higher-order spherical aberration occurs in the first lens. Furthermore, this causes the image plane-side surface of the fifth lens to be closer to the image pickup plane. Therefore, it is likely that a space in which the infrared cut filter or the sixth lens is arranged is limited.

By satisfying a range represented by the conditional expression (6), it is possible to (i) reduce sensitivity of each lens with respect to the manufacturing tolerance, (ii) suppress occurrence of higher-order spherical aberration, and (iii) cause, for example, the fifth lens to successfully carry out a function of correcting field curvature and/or the sixth lens to successfully carry out a function of controlling a CRA.

The image pickup lens in accordance with Aspect 14 of the present invention can be arranged such that, in any of Aspects 1 through 13, the image pickup lens satisfies the following conditional expression (7):

$$(f5+f6)/f < -2.0 \tag{7}$$

where: f represents a focal length of the image pickup lens; f5 represents a focal length of the fifth lens; and f6 represents a focal length of the sixth lens.

The conditional expression (7) defines an appropriate range of a sum of the focal length of the fifth lens and the focal length of the sixth lens with respect to the focal length of the image pickup lens, and is a condition effective in reducing the height of the image pickup lens. By satisfying a range represented by the conditional expression (7), it is possible to cause the negative refractive power of each of the fifth lens and the sixth lens, which negative refractive power accounts for refractive power of the image pickup lens, to be appropriate. This ultimately makes it possible to reduce the height of the image pickup lens while maintaining the telephotographic characteristic.

The image pickup lens in accordance with Aspect 15 of the present invention can be arranged such that, in any of Aspects 1 through 14, the image pickup lens satisfies the following conditional expressions (8) and (9):

$$50 < vd1 < 70 \tag{8}$$

$$20 < vd2 < 30 \tag{9}$$

where: vd1 represents an Abbe number of the first lens with respect to d rays; and vd2 represents an Abbe number of the second lens with respect to the d rays.

The conditional expression (8) defines an appropriate range of the Abbe number of the first lens. Similarly, the conditional expression (9) defines an appropriate range of the Abbe number of the second lens. By using a low dispersion material for the first lens and using a high dispersion material for the second lens, it is possible to successfully correct chromatic aberration.

The image pickup lens in accordance with Aspect 16 of the present invention can be arranged such that, in any of Aspects 1 through 15, the image pickup lens satisfies the following conditional expression (10):

$$0.5 < TTL/2ih < 1.0 \quad (10)$$

where: TTL represents a distance, along an optical axis of the image pickup lens, between the object-side surface of the first lens and the image pickup plane; and ih represents a maximum image height.

The conditional expression (10) defines an appropriate range of a ratio between the optical overall length of the image pickup lens and the maximum image height of the image pickup lens. By satisfying a range represented by the conditional expression (10), it is possible to keep the optical overall length of the image pickup lens short, and possible to reduce the height of the image pickup lens. Furthermore, it is possible to (i) successfully correct various aberrations, (ii) successfully control a CRA, and (iii) maintain a stable manufacturing yield, without inhibiting a degree of freedom of a thickness or a shape of each lens.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 100a through 100g Image pickup lens
IMG Image pickup plane
L1 First lens
L2 Second lens
L3 Third lens
L4 Fourth lens
L5 Fifth lens
L6 Sixth lens
L1F through L6F Object-side surface (surface on an object side)
L1R through L6R Image plane-side surface (surface on an image plane side)
X Optical axis

The invention claimed is:
1. An image pickup lens which causes an image of an object to be formed on an image pickup plane of an image pickup device, the image pickup lens comprising:
 a first lens;
 a second lens;
 a third lens;
 a fourth lens;
 a fifth lens; and
 a sixth lens,
 the first lens, the second lens, the third lens, the fourth lens, the fifth lens, and the sixth lens being arranged in this order from an object side toward an image plane side,
 the first lens having positive refractive power,
 the fifth lens and the sixth lens each having negative refractive power,
 an object-side surface of the first lens being a convex surface,
 at least one of an object-side surface and an image plane-side surface of each of the second lens, the third lens, the fourth lens, and the fifth lens being an aspheric surface,
 an object-side surface of the sixth lens being a concave surface and being an aspheric surface,
 an image plane-side surface of the sixth lens being an optically planar surface throughout a region corresponding to an effective diameter of the image plane-side surface of the sixth lens,
 the image pickup lens satisfying the following conditional expressions:

$$0.2 < T5/ih < 0.5$$

where: T5 represents a distance, along an optical axis of the image pickup lens, between the image plane-side surface of the fifth lens and the object-side surface of the sixth lens; and ih represents a maximum image height; and $$0.5 < f1/f4 < 2.0$$

where: f1 represents a focal length of the first lens; and f4 represents a focal length of the fourth lens.
2. The image pickup lens as set forth in claim 1, wherein, in a case where it is assumed that the first lens, the second lens, the third lens, the fourth lens, and the fifth lens constitute a first group and the sixth lens constitutes a second group, the first group is movable along the optical axis of the image pickup lens.
3. The image pickup lens as set forth in claim 1, wherein, in a case where it is assumed that the first lens, the second lens, the third lens, the fourth lens, and the fifth lens constitute a first group and the sixth lens constitutes a second group, the first group is movable in a direction parallel to the image pickup plane.
4. The image pickup lens as set forth in claim 1, wherein a distance between the image plane-side surface of the sixth lens and the image pickup plane is not more than 0.1 mm.
5. The image pickup lens as set forth in claim 1, wherein the image pickup lens satisfies the following conditional expression:

$$|L6Fsag|/D6 < 1.2$$

where: L6Fsag represents a maximum value of an aspheric surface sag amount of the object side-surface of the sixth lens; and D6 represents a thickness, along the optical axis of the image pickup lens, of the sixth lens.
6. The image pickup lens as set forth in claim 1, wherein the second lens has negative refractive power.
7. The image pickup lens as set forth in claim 1, wherein:
 the object-side surface of the third lens is a convex surface; and
 each of the object-side surface and the image plane-side surface of the third lens is an aspheric surface.
8. The image pickup lens as set forth in claim 1, wherein:
 the image plane-side surface of the fourth lens is a convex surface;
 the fourth lens has positive refractive power; and
 each of the object-side surface and the image plane-side surface of the fourth lens is an aspheric surface.
9. The image pickup lens as set forth in claim 1, wherein:
 the image plane-side surface of the fifth lens is a concave surface; and
 the image plane-side surface of the fifth lens includes an aspheric surface having, at a position apart from the optical axis of the image pickup lens, such a pole that a tangent plane at the pole is perpendicular to the optical axis.

10. The image pickup lens as set forth in claim 1, wherein the image pickup lens satisfies the following conditional expressions:

$$0.6 < f1/f < 1.8$$

$$-3.3 < f2/f < -1.0$$

where: f represents a focal length of the image pickup lens; f1 represents the focal length of the first lens; and f2 represents a focal length of the second lens.

11. The image pickup lens as set forth in claim 1, wherein the image pickup lens satisfies the following conditional expression:

$$1.0 < |f3/f1|$$

where: f represents a focal length of the image pickup lens; and f3 represents a focal length of the third lens.

12. The image pickup lens as set forth in claim 1, wherein the image pickup lens satisfies the following conditional expression:

$$(f5+f6)/f < -2.0$$

where: f represents a focal length of the image pickup lens; f5 represents a focal length of the fifth lens; and f6 represents a focal length of the sixth lens.

13. The image pickup lens as set forth in claim 1, wherein the image pickup lens satisfies the following conditional expressions:

$$50 < vd1 < 70$$

$$20 < vd2 < 30$$

where: vd1 represents an Abbe number of the first lens with respect to d rays;

and vd2 represents an Abbe number of the second lens with respect to the d rays.

14. The image pickup lens as set forth in claim 1, wherein the image pickup lens satisfies the following conditional expression:

$$0.5 < TTL/2ih < 1.0$$

where: TTL represents a distance, along the optical axis of the image pickup lens, between the object-side surface of the first lens and the image pickup plane; and ih represents the maximum image height.

\* \* \* \* \*

UNITED STATES PATENT AND TRADEMARK OFFICE
CERTIFICATE OF CORRECTION

PATENT NO. : 10,634,875 B2
APPLICATION NO. : 16/094829
DATED : April 28, 2020
INVENTOR(S) : Norimichi Shigemitsu et al.

Page 1 of 1

It is certified that error appears in the above-identified patent and that said Letters Patent is hereby corrected as shown below:

In Claim 11:
"…the following conditional expression: $1.0<|f3/f1|$"

Should be corrected to:
"…the following conditional expression: $1.0<|f3/f|$"

Signed and Sealed this
Twenty-eighth Day of July, 2020

Andrei Iancu
*Director of the United States Patent and Trademark Office*